US012785311B2

(12) United States Patent
Kato et al.

(10) Patent No.: US 12,785,311 B2
(45) Date of Patent: Nov. 3, 2026

(54) CONNECTOR, CONNECTOR SET, AND CONNECTOR-EQUIPPED CABLE

(71) Applicants: ACES Electronics Co., Ltd., Taoyuan County (TW); ACES Japan Co., Ltd., Tokyo (JP)

(72) Inventors: Nobukazu Kato, Tokyo (JP); Hiroaki Hashimoto, Tokyo (JP)

(73) Assignees: ACES Electronics Co., Ltd., Taoyuan (CN); ACES Japan Co., Ltd., Tokyo (JP)

( * ) Notice: Subject to any disclaimer, the term of this patent is extended or adjusted under 35 U.S.C. 154(b) by 378 days.

(21) Appl. No.: 18/685,950

(22) PCT Filed: Aug. 24, 2022

(86) PCT No.: PCT/JP2022/031935
§ 371 (c)(1),
(2) Date: Feb. 23, 2024

(87) PCT Pub. No.: WO2023/027126
PCT Pub. Date: Mar. 2, 2023

(65) Prior Publication Data

US 2024/0372278 A1 Nov. 7, 2024

(30) Foreign Application Priority Data

Aug. 25, 2021 (JP) ................................ 2021-137428

(51) Int. Cl.
*H01R 12/79* (2011.01)
*H01R 13/6585* (2011.01)

(52) U.S. Cl.
CPC ......... *H01R 12/79* (2013.01); *H01R 13/6585* (2013.01)

(58) Field of Classification Search
CPC ...... H01R 12/79; H01R 12/52; H01R 12/732; H01R 13/6585; H01R 24/50
(Continued)

(56) References Cited

U.S. PATENT DOCUMENTS

| | | | | |
|---|---|---|---|---|
| 7,207,842 B1 * | 4/2007 | Kenjo | H01R 12/79 | 439/74 |
| 7,377,803 B2 * | 5/2008 | Matsuoka | H01R 12/598 | 439/497 |

(Continued)

FOREIGN PATENT DOCUMENTS

| | | |
|---|---|---|
| JP | 2001093346 A | 4/2001 |
| JP | 2020123438 A | 8/2020 |
| WO | 2021024941 A1 | 2/2021 |

OTHER PUBLICATIONS

PCT International Search Report for International Application No. PCT/JP2022/031935, mailed Nov. 15, 2022, 5pp.

(Continued)

*Primary Examiner* — Gary F Paumen
(74) *Attorney, Agent, or Firm* — The Roy Gross Law Firm, LLC; Roy D. Gross

(57) ABSTRACT

The connector is a wire-to-board connector for connecting, through mating with a partner connector mounted on a circuit board, the circuit board to one or more connection target cables that have a first electroconduction path used for transmitting high-frequency signals, a second electroconduction path used for shielding, and a plurality of third electroconduction paths. The connector is provided with a first contact connected to the first electroconduction path, a second contact connected to the second electroconduction path, third contacts connected to the third electroconduction paths, and an insulator. The second contact has an inter-contact shielding section arranged between a first contact section and third contact sections. The first contact section (Continued)

and the inter-contact shielding section are arranged on both sides, in the pitch direction, of a plurality of third contact sections. The inter-contact shielding section is arranged between the first contact section and the third contact sections.

20 Claims, 22 Drawing Sheets

(58) Field of Classification Search
USPC .................................................... 439/77, 74
See application file for complete search history.

(56) References Cited

U.S. PATENT DOCUMENTS

| | | | | |
|---|---|---|---|---|
| 7,789,678 | B2 * | 9/2010 | Nagata | H01R 12/716 439/607.05 |
| 8,894,433 | B2 * | 11/2014 | Little | H01R 12/7005 439/378 |
| 10,741,973 | B2 * | 8/2020 | Yufu | H01R 12/79 |
| 11,228,149 | B2 * | 1/2022 | Sloey | H01R 24/50 |
| 2009/0227138 | A1 * | 9/2009 | Lv | H01R 12/79 439/466 |
| 2019/0348800 | A1 * | 11/2019 | Yufu | H01R 13/6582 |
| 2020/0076132 | A1 * | 3/2020 | Yang | H01R 12/73 |
| 2020/0244011 | A1 | 7/2020 | Kitazawa | |
| 2021/0013651 | A1 * | 1/2021 | Chi | H01R 12/7023 |
| 2021/0098952 | A1 | 4/2021 | Sloey et al. | |
| 2022/0320775 | A1 | 10/2022 | Kato | |

OTHER PUBLICATIONS

PCT Written Opinion for International Application No. PCT/JP2022/031935, mailed Nov. 15, 2022, 6pp.

* cited by examiner

CONNECTOR, CONNECTOR SET, AND CONNECTOR-EQUIPPED CABLE

CROSS REFERENCE TO RELATED APPLICATIONS

This application is a National Phase of PCT Patent Application No. PCT/JP2022/031935 having International filing date of Aug. 24, 2022, which claims the benefit of priority of Japanese Patent Application No. 2021-137428, filed Aug. 25, 2021, the contents of which are all incorporated herein by reference in their entirety.

TECHNICAL FIELD

The present invention relates to a connector, a connector set and a connector-equipped cable, and in particular to a technique suitable for an in-equipment wiring of a communication device.

BACKGROUND ART

In recent years, as next-generation mobile communication-compatible apparatuses such as 5G-compatible smartphones have been increasingly used, connectors used for the in-equipment wiring have been increasingly improved. For example, PTL 1 discloses, as a board-to-wire connector for a case where the distance between an antenna module board and a main board of the communication device is long, a connector that can collectively electrically connect, to the antenna module board, a radio frequency signal transmission coaxial cable and other electric wires such as a discrete cable.

CITATION LIST

Patent Literature

PTL 1
WO2021/024941

SUMMARY OF INVENTION

Technical Problem

Incidentally, it is desirable that the in-equipment wiring of communication devices be small and have high transmission characteristics, which requires further improvement of the connectors. An object of the present invention is to provide a connector, a connector set and a connector-equipped cable that can meet the requirement of the in-equipment wiring of the communication device.

Solution to Problem

A connector according to the present invention is configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector including: a plurality of first contacts including a first contact point part connected to a first mating contact of the mating connector and a first connection part connected to the first conductive path; a second contact including a second connection part connected to the second conductive path; a plurality of third contacts including a third contact point part connected to a third mating contact of the mating connector and a third connection part connected to the third conductive path; and an insulator to which the first contact, the second contact and the third contact are assembled, the second contact includes a contact-to-contact shielding part disposed between the first contact point part and the third contact point part, the first contact point part and the contact-to-contact shielding part are disposed on both sides of a plurality of the third contact point parts in a pitch direction, and the contact-to-contact shielding part is disposed between the first contact point part and the third contact point part.

A connector according to the present invention is configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector: a first contact including a first contact point part connected to a first mating contact of the mating connector and a first connection part connected to the first conductive path; a second contact including a second connection part connected to the second conductive path; a third contact including a third contact point part connected to a third mating contact of the mating connector and a third connection part connected to the third conductive path; an insulator to which the first contact, the second contact and the third contact are assembled; and a cable holding part configured to hold the connection object cable so as to be drawn out in a pitch direction, the pitch direction being an arrangement direction of the third contact point part.

A connector according to the present invention is configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector: a first contact including a first contact point part connected to a first mating contact of the mating connector and a first connection part connected to the first conductive path; a second contact including a second connection part connected to the second conductive path; a third contact including a third contact point part connected to a third mating contact of the mating connector and a third connection part connected to the third conductive path; and an insulator to which the first contact, the second contact and the third contact are assembled, the second contact includes a contact-to-contact shielding part disposed between the first contact point part and the third contact point part, the first contact point part, the contact-to-contact shielding part and a plurality of the third contact point parts are disposed side by side in this order in a pitch direction to form a connector contact point part, and the connector contact point part includes two connector contact point parts disposed such that the first contact point part, the contact-to-contact shielding part and the plurality of third contact point parts are disposed in a line-symmetric manner with respect to a center line along the pitch direction.

A connector according to the present invention is configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector: a first contact including a first contact point part connected to a first mating contact of the mating connector and a first connection part connected to the first conductive path; a second contact including a second connection part connected to the second conductive path; a third contact including a third contact point part connected to a third mating contact of the mating connector and a third connection part connected to the third conductive path; and an insulator to which the first contact, the second contact and the third contact are assembled, the second contact includes a contact-to-contact shielding part disposed between the first contact point part and the third contact point part, the first contact point part, the contact-to-contact shielding part and a plurality of the third contact point parts are disposed side by side in this order in a pitch direction to form a connector contact point part, and the connector contact point part includes two connector contact point parts disposed such that the first contact point part, the contact-to-contact shielding part and the plurality of third contact point parts are disposed in a point-symmetric manner with respect to a center point on a center line along the pitch direction.

A connector set according to the present invention includes: a plug connector including the connector; and a receptacle connector including the mating connector.

A connector-equipped cable according to the present invention includes: the connector; and the connection object cable connected to the connector and drawn in the pitch direction.

Advantageous Effects of Invention

The connector, the connector set and the connector-equipped cable according to the present invention can widely meet the requirement of the in-equipment wiring of the communication device.

DESCRIPTION OF EMBODIMENTS

Embodiments of the present invention are elaborated below with reference to the accompanying drawings.

First Embodiment

Figure 1A:
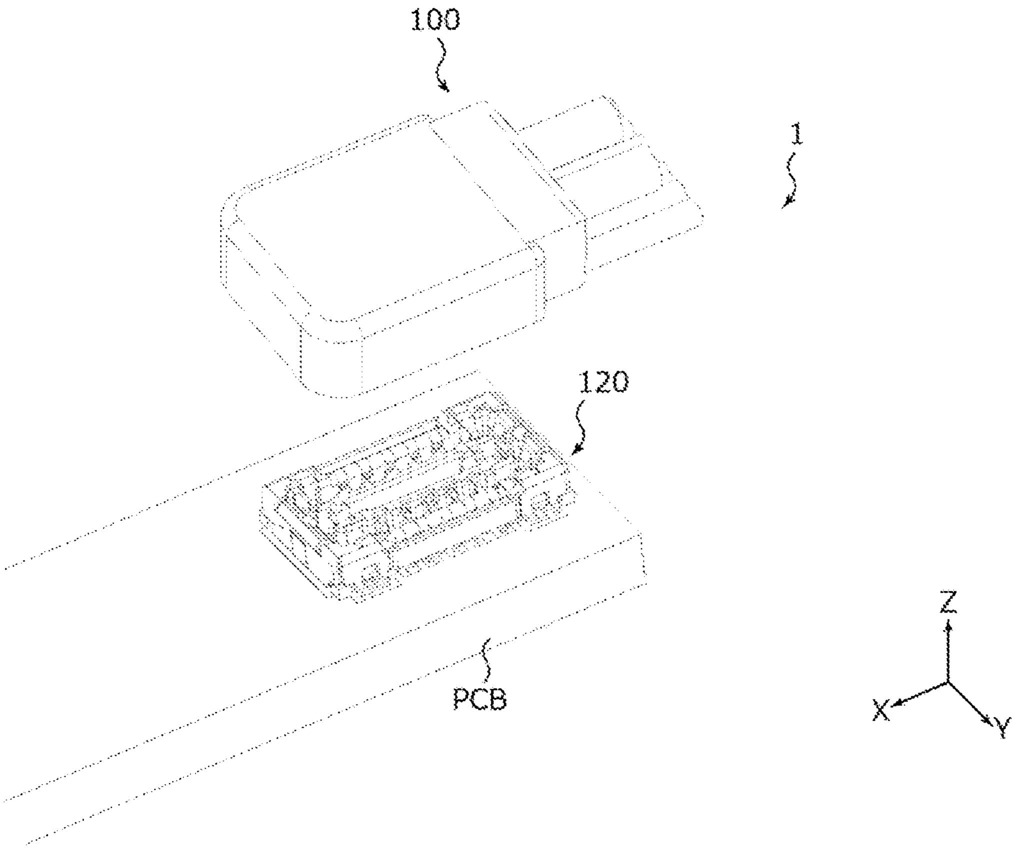
FIGS. 1A and 1B are perspective views illustrating an external appearance of a connector set according to a first embodiment.
Figure 1B:
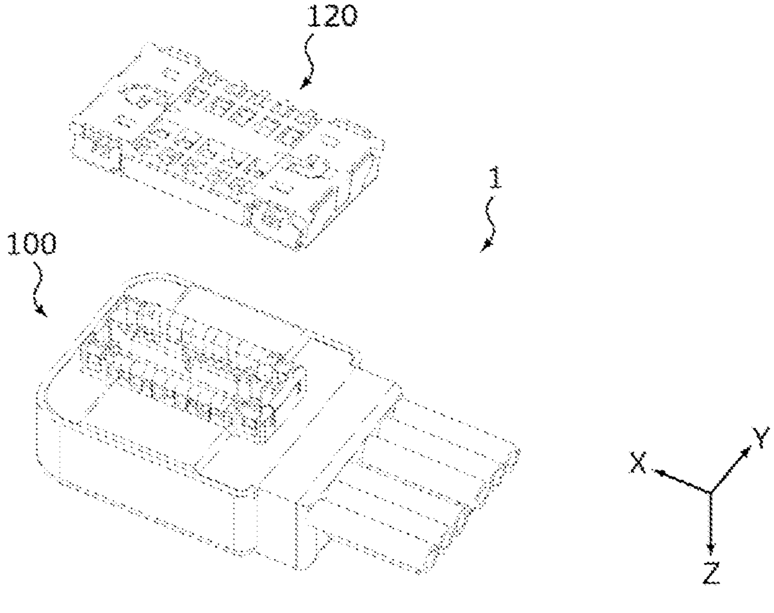

FIGS. 1A and 1B are perspective views illustrating an external appearance of connector set 1 according to a first embodiment of the present invention. FIGS. 1A and 1B illustrate a state where connector set 1 is disassembled, i.e., a state before plug connector 100 and receptacle connector 120 are fit to each other. Note that in FIG. 1B, the illustration of antenna module board PCB where receptacle connector 120 is mounted is omitted.

The present embodiment is described with orthogonal coordinate systems (X, Y, Z). The drawings described later are illustrated with the common orthogonal coordinate systems (X, Y, Z). The X direction is the longitudinal direction (the pitch direction) of connector set 1, the Y direction is the width direction of connector set 1, and the Z direction is the fitting direction of connector set 1.

As illustrated in FIGS. 1A and 1B, connector set 1 includes plug connector 100 and receptacle connector 120. Connector set 1 is mounted as an in-equipment wiring of a next-generation mobile communication-compatible communication device (not illustrated) such as 5G-compatible smartphones, for example.

Plug connector 100 is attached to one end of connection object cable 10 and used as a connector-equipped cable. The other end of connection object cable 10 is connected to a main board (not illustrated) of a communication device, for example. Receptacle connector 120 is mounted at antenna module board PCB of a communication device.

In the present embodiment, connection object cable 10 is composed of two coaxial cables 11 and six discrete cables

12. Note that for connection object cable 10, flat cables such as flexible flat cables (FFC) and flexible printed circuit boards (FPC) are applicable. In the present embodiment, connection object cable 10 is connected in two stages differing in the Z direction to plug connector 100, i.e., two flat cables are applied.

Coaxial cable 11 includes inner conductor 11*a* (first conductive path), and outer shield layer 11*b* (second conductive path) disposed outside inner conductor 11*a* through an insulator (whose reference numeral is omitted). Inner conductor 11*a* of coaxial cable 11 is used for transmission of radio frequency signals. Discrete cable 12 includes inner conductor 12*a* (third conductive path). Inner conductor 12*a* of discrete cable 12 is used as a power line (power source line), a control line, or a signal line.

Connector set 1 electrically connects connection object cable 10 and antenna module board PCB through fitting of plug connector 100 and receptacle connector 120. More specifically, inner conductor 11*a* of coaxial cable 11 and inner conductor 12*a* of discrete cable 12 are electrically connected to the conductor pattern (not illustrated) of antenna module board PCB through first plug contact 101 and third plug contact 103 of plug connector 100 and first receptacle contact 121 and third receptacle contact 123 of receptacle connector 120. In addition, outer shield layer 11*b* of coaxial cable 11 is grounded to antenna module board PCB through second plug contact 102 of plug connector 100 and second receptacle contact 122 and receptacle shell 125 of receptacle connector 120.

In connector set 1, receptacle connector 120 is mounted on antenna module board PCB such that the extending direction of antenna module board PCB and the pitch direction of receptacle connector 120 coincide with the X direction, for example. In this case, in comparison with the mounted state where the width direction of antenna module board PCB and the pitch direction of receptacle connector 120 coincide with the Y direction, the width of antenna module board PCB can be reduced, and thus the space-saving of the in-equipment wiring can be achieved.

In addition, connection object cable 10 is drawn out from plug connector 100 such that the pitch direction of plug connector 100 and the extending direction of connection object cable 10 coincide with the X direction. In addition, the width of plug connector 100 in the Y direction is set to be equal to or smaller than the width of antenna module board PCB. In this manner, when plug connector 100 and receptacle connector 120 are fit to each other, the extending direction of connection object cable 10 can coincide with the extending direction of antenna module board PCB. Then, in comparison with the case where connection object cable 10 extends in the direction (the Y direction) orthogonal to the fitting direction and the pitch direction, i.e., connection object cable 10 extends in the direction at 90° with respect to the extending direction of antenna module board PCB, the space-saving of the in-equipment wiring can be achieved. Thus, connector set 1 is very useful for reducing the size of communication devices.

Detailed configurations of plug connector 100 and receptacle connector 120 are described below.

Figure 2:
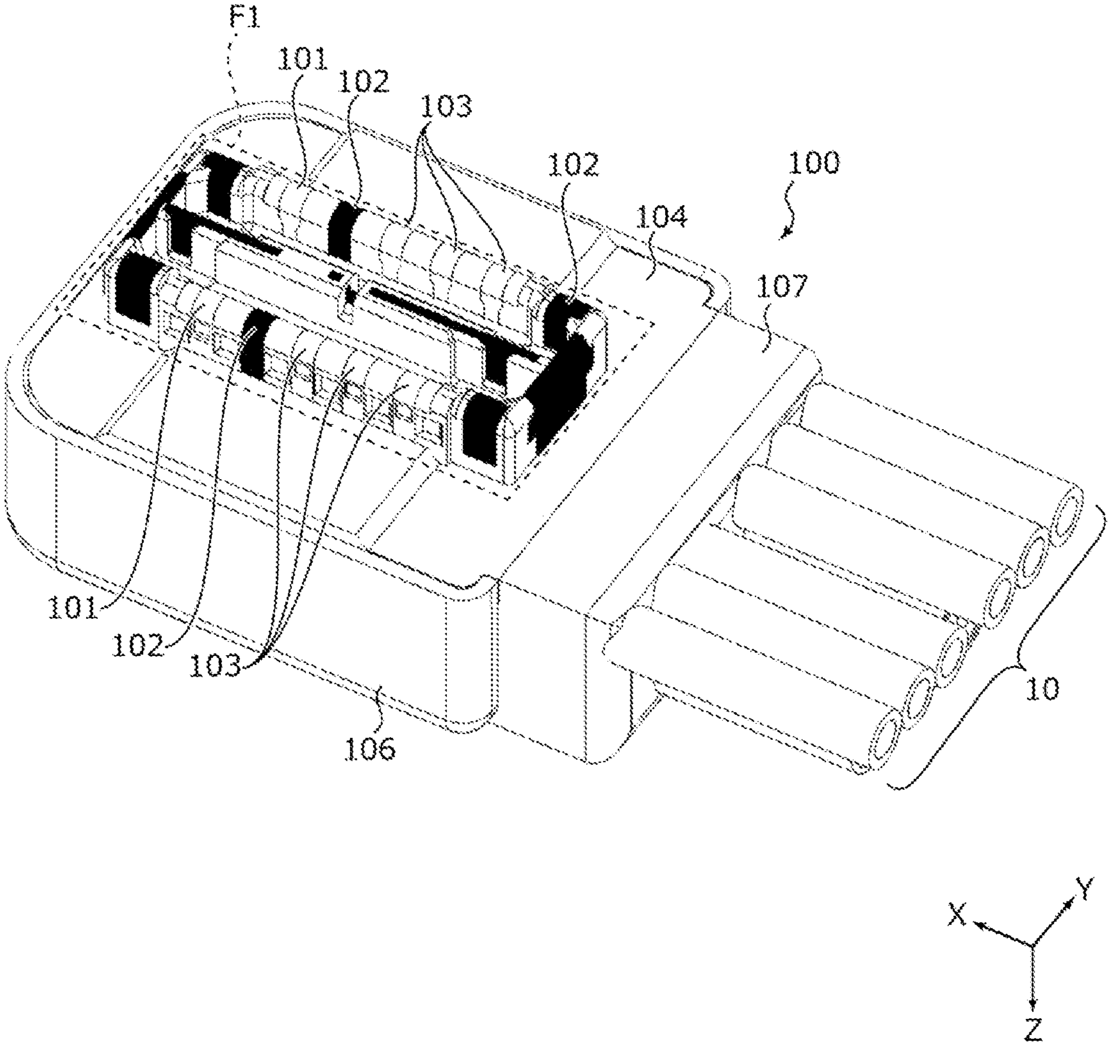
FIG. 2 is a perspective view illustrating an external appearance of a plug connector according to the first embodiment.

FIG. 2 is a perspective view illustrating an external appearance of plug connector 100. FIG. 2 is a perspective view illustrating an external appearance of plug connector 100 as viewed from the – side (hereinafter referred to as "the fitting side") in the Z direction on which it is fit to receptacle connector 120.

Figure 3:
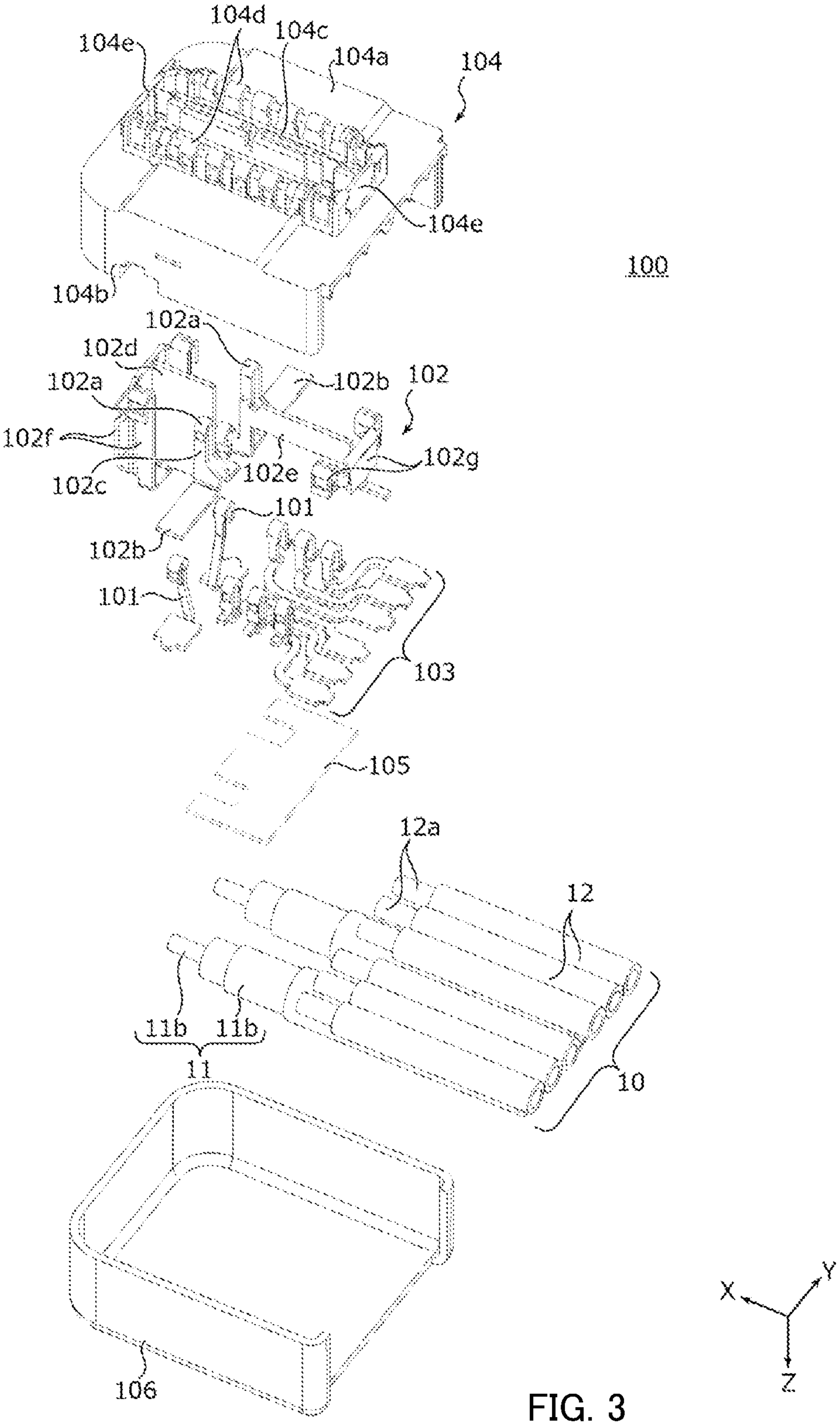
FIG. 3 is an exploded perspective view illustrating the plug connector according to the first embodiment.
Figure 4:
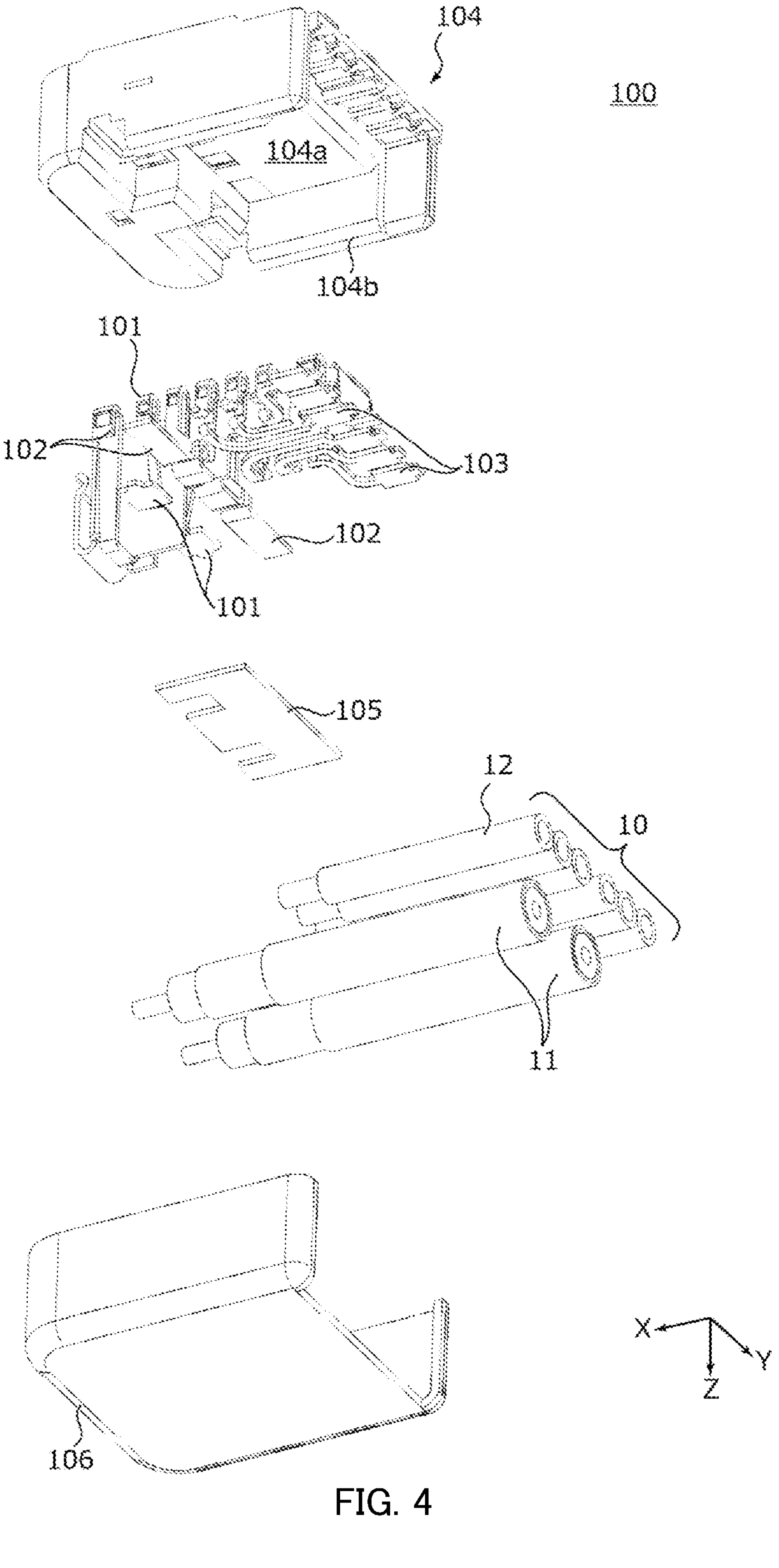
FIG. 4 is an exploded perspective view illustrating the plug connector according to the first embodiment.

FIGS. 3 and 4 are exploded perspective views illustrating plug connector 100. FIG. 3 is an exploded perspective view as viewed from the – side in the Z direction on the fitting side, and FIG. 4 is an exploded perspective view as viewed from the + side in the Z direction on the opposite side.

Figure 5A:
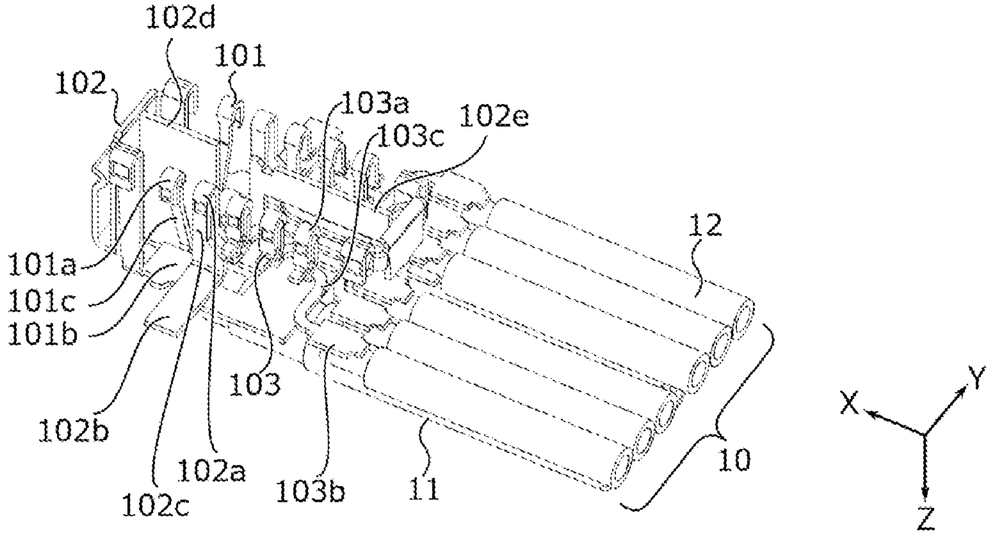
FIGS. 5A and 5B are diagrams illustrating wiring inside the plug connector according to the first embodiment.

FIGS. 5A to 6B are diagrams illustrating the wiring inside plug connector 100, and the illustration of plug insulator 104, plug cover 106 and molding 107 are omitted. FIG. 5A is a perspective view as viewed from the fitting side, FIG. 5B is a side view as viewed from the – side in the Y direction, FIG. 5C is a plan view as viewed from the fitting side, and FIG. 5D is a bottom view as viewed from the opposite side.

As illustrated in FIGS. 2 to 4, plug connector 100 includes first plug contact 101, second plug contact 102, third plug contact 103, plug insulator 104, plug cover 106, molding 107 and the like. First plug contact 101, second plug contact 102 and third plug contact 103 are formed of a conductive material such as metal (e.g., a copper alloy). Plug insulator 104 and molding 107 are formed of an insulating material such as a synthetic resin (e.g., liquid crystal polymer).

In FIG. 2, region F1 surrounded by the broken line is the fitting region of plug connector 100 as viewed from the fitting direction, i.e., the region where it is fit to receptacle connector 120 (hereinafter referred to as "fitting region F1"). In the present embodiment, first connection part 101*b* of first plug contact 101, shield connection part 102*b* of second plug contact 102 (second connection part) and third connection part 103*b* of third plug contact 103 are disposed to overlap fitting region F1 in the fitting direction.

First plug contact 101 includes first contact point part 101*a*, first connection part 101*b*, and first relaying part 101*c* that connects first contact point part 101*a* and first connection part 101*b*.

When plug connector 100 and receptacle connector 120 are fit to each other, first contact point part 101*a* is brought into contact with and electrically connected to first contact point part 121*a* of receptacle connector 120. More specifically, first contact point part 101*a* is folded-back in a U-shape toward the outside, and is provided with an engaging protrusion (whose reference numeral is omitted) that engages with an engaging recess (whose reference numeral is omitted) of first receptacle contact 121 at the outer surface of the end portion.

Figure 5B:
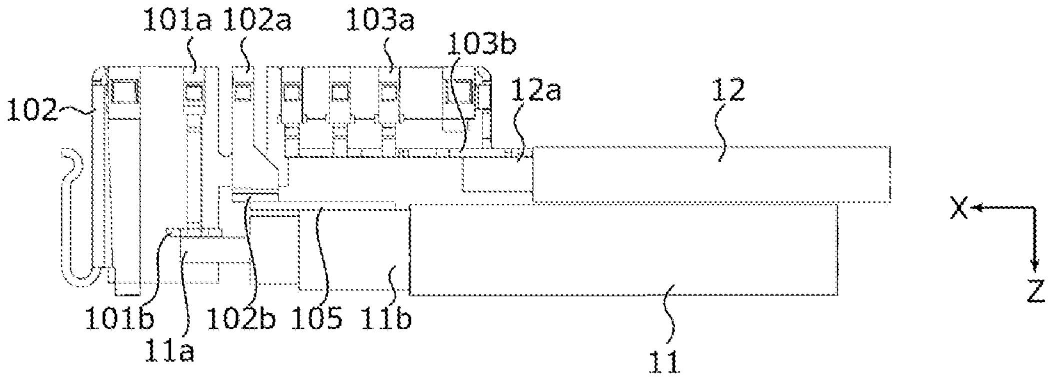

First connection part 101*b* is formed in a flat plate shape, and inner conductor 11*a* of coaxial cable 11 exposed at the step-stripped tip end portion is connected to it from the + side in the Z direction by soldering, for example (see FIGS. 5A and 5B). Two first connection parts 101*b* are disposed side by side in the Y direction orthogonal to the Z direction as the fitting direction and the X direction as the pitch direction. First relaying part 101*c* is substantially perpendicularly extends toward the + side in the Z direction from first contact point part 101*a*. Note that first relaying part 101*c* may include a portion bent and extended in the Y direction and then extended in the X direction (e.g., the + side in the X direction).

Plug connector 100 includes two first plug contacts 101 with symmetric shapes. Two first plug contacts 101 are disposed in a line-symmetric manner with respect to center line CL extending along the X direction.

Second plug contact 102 is a member connected to outer shield layer 11*b* of coaxial cable 11, and is electrically grounded to antenna module board PCB through second receptacle contact 122 and receptacle shell 125 of receptacle connector 120. Second plug contact 102 is formed by processing a single metal sheet, for example. Note that second plug contact 102 may be composed of a plurality of members as long as the members are electrically connected to each other.

Second plug contact 102 includes contact-to-contact shielding part 102*a*, shield connection part 102*b*, first center ground part 102*d*, second center ground part 102*e*, first fixing part 102*f* and second fixing part 102*g*.

Contact-to-contact shielding part 102*a* is disposed between first contact point part 101*a* of first plug contact 101 and third contact point part 103*a* of third plug contact 103. In the present embodiment, contact-to-contact shielding part 102*a* is brought into contact with and electrically connected to second receptacle contact 122 of receptacle connector 120 when plug connector 100 and receptacle connector 120 are fit to each other. More specifically, contact-to-contact shielding part 102*a* is folded-back in a U-shape toward the outside, and is provided with an engaging protrusion (whose reference numeral is omitted) that engages with an engaging recess (whose reference numeral is omitted) of second receptacle contact 122 at the outer surface of the end portion. Two contact-to-contact shielding parts 102*a* are disposed in a line-symmetric manner with respect to center line CL extending along the X direction.

Shield connection part 102*b* is formed in a flat plate shape, and is electrically connected to outer shield layer 11*b* of coaxial cable 11 through ground bar 105 (see FIGS. 5A and 5B). Two shield connection parts 102*b* are disposed side by side in the Y direction orthogonal to the Z direction as the fitting direction and the X direction as the pitch direction. Outer shield layer 11*b* of coaxial cable 11 exposed at the step-stripped tip end portion is connected to ground bar 105 from the + side in the Z direction by soldering, for example. In addition, ground bar 105 is connected to shield connection part 102*b* from the + side in the Z direction by soldering, for example. Contact-to-contact shielding part 102*a* and shield connection part 102*b* are coupled by second relaying part 102*c* extending substantially perpendicularly to the Z direction. Note that second relaying part 102*c* may include a portion bent and extended in the Y direction and then extended in the X direction.

First center ground part 102*d* and second center ground part 102*e* each have a flat plate shape extending in the XZ plane, and are disposed side by side in the X direction. Contact-to-contact shielding part 102*a* is coupled between first center ground part 102*d* and second center ground part 102*e*. First fixing part 102*f* is disposed at an end portion of first center ground part 102*d* on the + side in the X direction, and second fixing part 102*g* is disposed at an end portion of second center ground part 102*e* on the + side in the X direction.

Third plug contact 103 includes third contact point part 103*a*, third connection part 103*b*, and third relaying part 103*c* that connects third contact point part 103*a* and third connection part 103*b*.

When plug connector 100 and receptacle connector 120 are fit to each other, third contact point part 103*a* is brought into contact with and electrically connected to third contact point part 123*a* of receptacle connector 120. More specifically, third contact point part 103*a* is folded-back in a U-shape toward the outside, and is provided with an engaging protrusion (whose reference numeral is omitted) that engages with an engaging recess (whose reference numeral is omitted) of third receptacle contact 123 at the outer surface of the end portion.

Third connection part 103*b* is formed in a flat plate shape, and inner conductor 12*a* of discrete cable 12 exposed at the step-stripped tip end portion is connected to it from the + side in the Z direction by soldering, for example (see FIGS. 5A and 5B). Six third connection parts 103*b* are disposed side by side in the Y direction orthogonal to the Z direction as the fitting direction and the X direction as the pitch direction. Note that third connection parts 103*b* may be shifted from one another in a staggered manner in the X direction as long as they are disposed side by side in the Y direction as a whole, for example. Third relaying part 103*c* substantially perpendicularly extends toward the + side in the Z direction from third contact point part 103*a*, and is bent in the Y direction and extended inward, and then, extended in the X direction.

Plug connector 100 includes three pairs of third plug contacts 103 with symmetric shapes. Each of three pairs of third plug contacts 103 is disposed in a line-symmetric manner with respect to center line CL extending along the X direction.

Plug insulator 104 forms the housing of plug connector 100 together with plug cover 106. Plug insulator 104 includes base part 104*a*, side wall part 104*b*, center fitting protrusion 104*c*, first side fitting protrusion 104*d* and second side fitting protrusion 104*e*.

Base part 104*a* extends in the XY plane, and has a rectangular shape in plan view as viewed from the Z direction. Side wall part 104*b* is formed downward in the + side in the Z direction from the three sides of base part 104*a*.

Center fitting protrusion 104*c*, first side fitting protrusion 104*d* and second side fitting protrusion 104*e* are portions fit to receptacle connector 120, and are provided to protrude to the fitting side from base part 104*a*. Center fitting protrusion 104*c* has a flat plate shape extending in the XZ plane, and provided upright at the surface of base part 104*a* on the fitting side. First side fitting protrusion 104*d* and second side fitting protrusion 104*e* are provided upright to surround center fitting protrusion 104*c* at the surface of base part 104*a* on the fitting side, forming a rectangular frame part.

First plug contact 101, second plug contact 102 and third plug contact 103 are assembled to plug insulator 104. First plug contact 101, second plug contact 102 and third plug contact 103 are formed integrally with plug insulator 104 by insert molding, for example. First plug contact 101, second plug contact 102 and third plug contact 103 are separated from each other and are electrically isolated from each other by plug insulator 104.

First contact point part 101*a* of first plug contact 101, contact-to-contact shielding parts 102*a* of second plug contact 102 and third contact point part 103*a* of third plug contact 103 are disposed at first side fitting protrusion 104*d* of plug insulator 104, with the surface exposed. First connection part 101*b* of first plug contact 101, shield connection part 102*b* of second plug contact 102 and third connection part 103*b* of third plug contact 103 are exposed from the inner surface side of base part 104*a* of plug insulator 104.

First center ground part 102*d* and second center ground part 102*e* of second plug contact 102 are disposed at center fitting protrusion 104*c* of plug insulator 104, with the surface exposed at least in part (the part where it makes contact with receptacle shell 125 of receptacle connector 120). First fixing part 102*f* and second fixing part 102*g* of second plug contact 102 are disposed at second side fitting protrusion 104*e* of plug insulator 104, with the outer surface exposed.

Plug cover 106 is a protector that forms the housing of plug connector 100 together with plug insulator 104, and is disposed to cover the side surface of plug insulator 104. Preferably, plug cover 106 is formed of a metal conductive material. In this case, by electrically connecting plug cover 106 to second plug contact 102 to have the ground potential, it can function as a shield. Note that as with plug insulator 104, plug cover 106 may be formed of an insulating material such as a synthetic resin.

Molding 107 functions as a cable holding part that holds connection object cable 10 (coaxial cable 11 and discrete cable 12) at a predetermined orientation. Molding 107 is formed by connecting connection object cable 10 to first plug contact 101, second plug contact 102 and third plug contact 103 assembled to plug insulator 104, and injecting and curing a mold resin after housing them in plug cover 106 disposed in a metal mold.

Coaxial cable 11 and discrete cable 12 are held by molding 107 in the state where they are disposed in two stages differing in the fitting direction. That is, first connection part 101*b* of first plug contact 101, shield connection part 102*b* of second plug contact 102 and third connection part 103*b* of third plug contact 103 are disposed in two stages differing in the fitting direction. In this manner, in comparison with the case where connection object cable 10 is arranged in one stage (see, e.g., the second embodiment), the arrangement width of connection object cable 10 is smaller, and thus the width of plug connector 100 can be easily set to a width equal to or smaller than antenna module board PCB.

In the first embodiment, the pin assign in plug connector 100 is as follows.

Figure 6A:
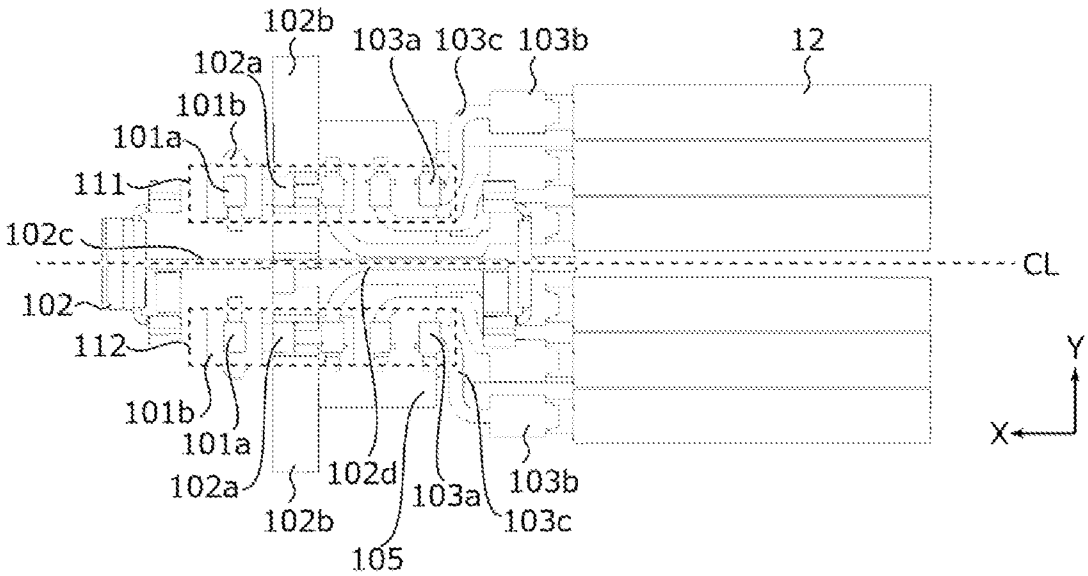
FIGS. 6A and 6B are diagrams illustrating wiring inside the plug connector according to the first embodiment.
Figure 6B:
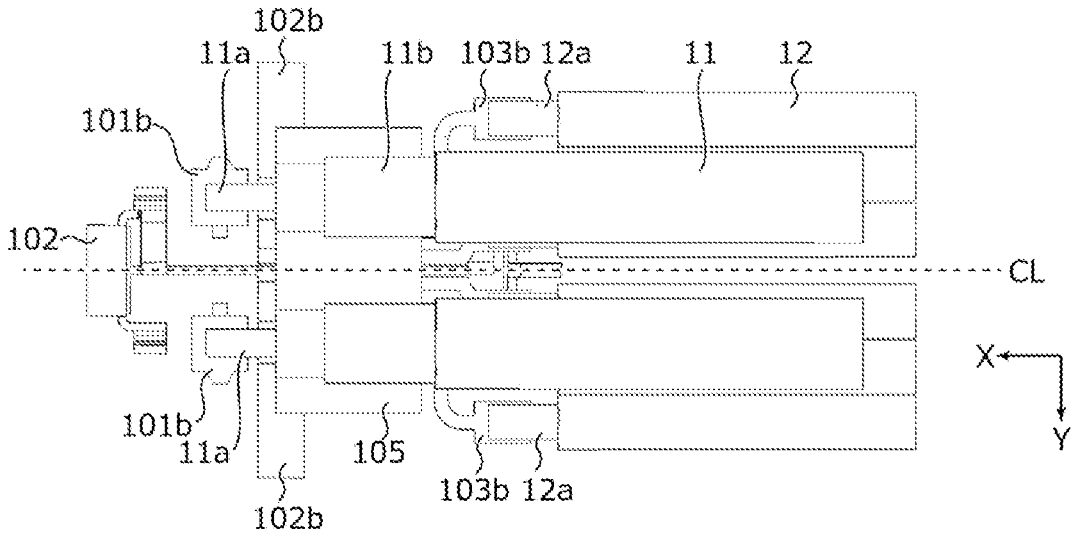

Specifically, first contact point part 101*a* of first plug contact 101, contact-to-contact shielding parts 102*a* of second plug contact 102 and third contact point part 103*a* of third plug contact 103 are disposed side by side in this order in the X direction as the pitch direction to form two connector contact point parts 111 and 112 (see FIGS. 6A and 6B). Connector contact point parts 111 and 112 are disposed in two lines facing each other with center line CL extending along the X direction interposed therebetween. In addition, connector contact point parts 111 and 112 are disposed such that first contact point part 101*a*, contact-to-contact shielding part 102*a* and three third contact point parts 103*a* are disposed in a line-symmetric manner with respect to center line CL extending along the X direction.

With contact-to-contact shielding part 102*a* having the ground potential disposed between first contact point part 101*a* and third contact point part 103*a*, the part between first contact point part 101*a* and third contact point part 103*a* is shielded. In addition, with first center ground part 102*d* and second center ground part 102*e* of second plug contact 102 disposed between connector contact point parts 111 and 112, the part between connector contact point parts 111 and 112 is shielded.

In this manner, the EMS characteristics in the transmission line can be improved, and a favorable transmission quality can be ensured. In particular, in the present embodiment, two first contact point parts 101*a* face each other and are close to each other in the Y direction, but the part between them is shielded with first center ground part 102*d*, and thus the cross talk between the two radio frequency signal transmission lines can be suppressed.

Figure 7A:
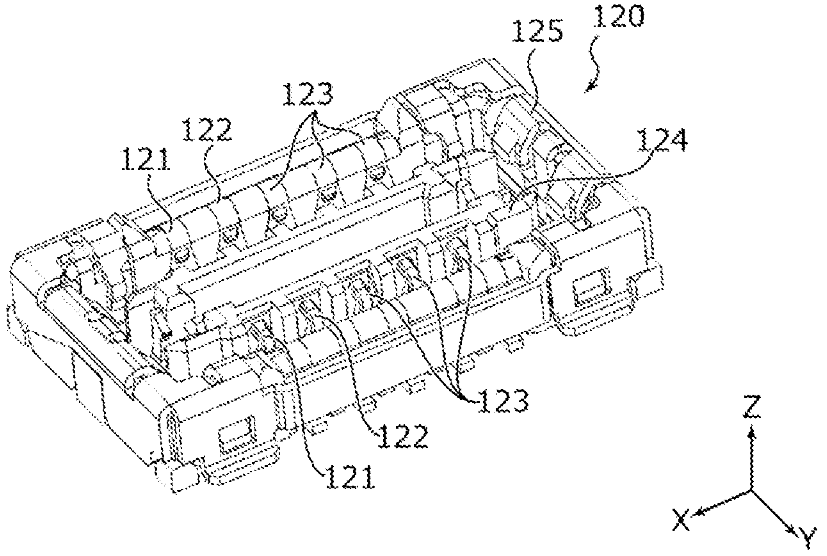
FIGS. 7A and 7B are views illustrating an external appearance of a receptacle connector according to the first embodiment.
Figure 7B:
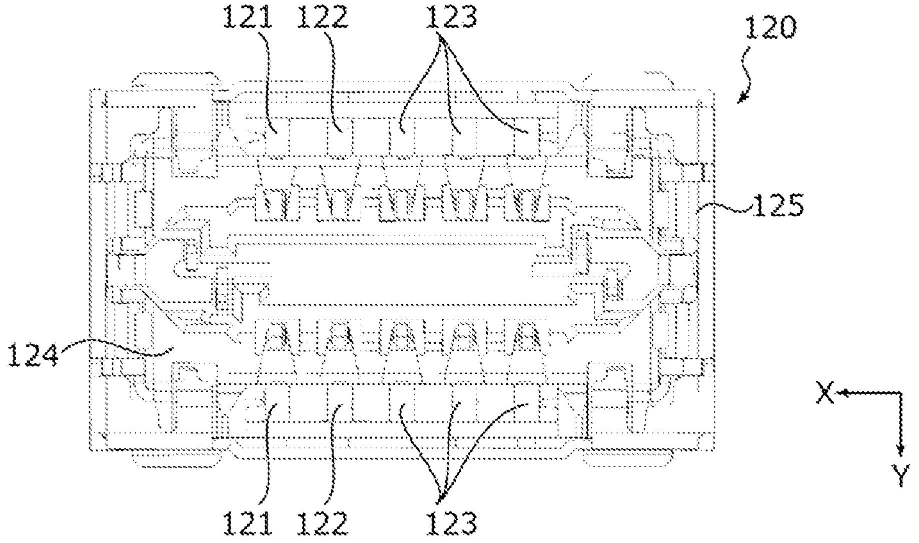

FIGS. 7A and 7B are views illustrating an external appearance of receptacle connector 120. FIG. 7A is a perspective view illustrating an external appearance of receptacle connector 120 as viewed from the + side in the Z direction (hereinafter referred to as "fitting side") on which it is fit to plug connector 100. FIG. 7B is a plan view illustrating receptacle connector 120 as viewed from the fitting side.

Figure 8:
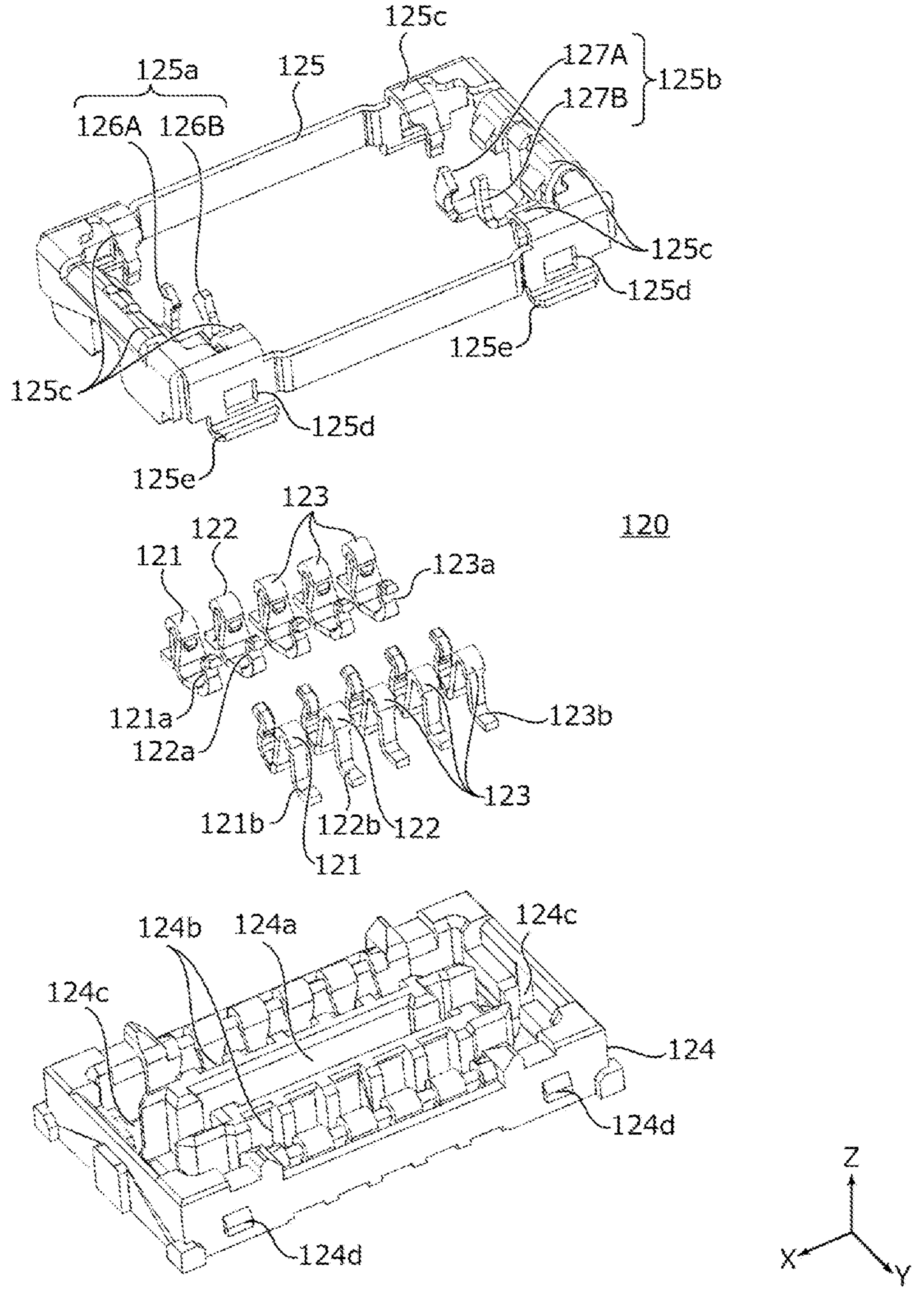
FIG. 8 is an exploded perspective view illustrating the receptacle connector according to the first embodiment.

FIG. 8 is an exploded perspective view illustrating receptacle connector 120 as viewed from the fitting side.

As illustrated in FIGS. 7A, 7B and 8, receptacle connector 120 includes first receptacle contact 121, second receptacle contact 122, third receptacle contact 123, receptacle insulator 124 and receptacle shell 125.

First receptacle contact 121, second receptacle contact 122, third receptacle contact 123 and receptacle shell 125 are formed of a conductive material such as metal (e.g., a copper alloy). Receptacle insulator 124 is formed of an insulating material such as a synthetic resin (e.g., liquid crystal polymer).

First receptacle contact 121, second receptacle contact 122 and third receptacle contact 123 have the same shape, and disposed side by side at first side fitting recess 124*b* of receptacle insulator 124. The pin assign in receptacle connector 120 corresponds to the pin assign of plug connector 100. Note that first receptacle contact 121, second receptacle contact 122 and third receptacle contact 123 may not have the same shape, while the same shape allows for the use of common contact components.

First receptacle contact 121 includes first contact point part 121*a* and first connection part 121*b*. Second receptacle contact 122 includes second contact point part 122*a* and second connection part 122*b*. Third receptacle contact 123 includes third contact point part 123*a* and third connection part 123*b*.

First contact point part 121*a*, second contact point part 122*a* and third contact point part 123*a* are each brought into contact with and electrically connected to first contact point part 101*a*, contact-to-contact shielding part 102*a* and third contact point part 103*a* of plug connector 100 when plug connector 100 and receptacle connector 120 are fit to each other. More specifically, first contact point part 121*a*, second contact point part 122*a* and third contact point part 123*a* are each curved in a U-shape, and provided with a spring piece (whose reference numeral is omitted) for applying a biasing force to the opposite surface at the tip end portion as the free end. In addition, engaging recesses (whose reference numeral is omitted) that engage with engaging protrusions (whose reference numeral is omitted) of first plug contact 101, second plug contact 102 and third plug contact 103 are provided at the surfaces facing the spring pieces.

First connection part 121*b*, second connection part 122*b* and third connection part 123*b* are each drawn to the side opposite to the fitting side, and connected to the conductor pattern of antenna module board PCB by soldering, for example.

Receptacle shell 125 is a frame connected to the ground of antenna module board PCB, and has a rectangular shape corresponding to the outer edge of receptacle insulator 124 in plan view as viewed from the Z direction. Receptacle shell 125 includes first ground contact point part 125*a*, second ground contact point part 125*b*, engagement piece 125*c*, engagement hole 125*d* and ground connection part 125*e*. Receptacle shell 125 is formed by processing a single metal sheet, for example.

First ground contact point part 125*a* and second ground contact point part 125*b* each extend inward in the X direction from an approximate center of the short side of receptacle shell 125 along the Y direction. First ground contact point part 125*a* and second ground contact point part 125*b* are brought into contact with and electrically connected to first center ground part 102*d* and second center ground part 102*e* of second plug contact 102 when plug connector 100 and receptacle connector 120 are fit to each other.

More specifically, first ground contact point part 125*a* includes contact segments 126A and 126B with a tuning-fork shape with a bifurcated tip end. Contact segments 126A and 126B are each extended from the root of the branch to the − side in the X direction, and bent in an L-shape to the + side in Z direction as the thickness direction. First ground contact point part 125*a* sandwiches and holds first center ground part 102*d* with the spring elasticity of contact segments 126A and 126B. The contact point of contact segments 126A and 126B with first center ground part 102*d* is shifted in the X direction so as to stably hold the posture of first center ground part 102*d*.

Likewise, second ground contact point part 125*b* includes contact segments 127A and 127B with a tuning-fork shape with a bifurcated tip end. Contact segments 127A and 127B are each extended from the root of the branch+ side in the X direction, and bent in an L-shape to the + side in Z direction as the thickness direction. Second ground contact point part 125*b* sandwiches and holds second center ground part 102*e* with the spring elasticity of contact segments 127A and 127B. The contact point of contact segments 127A and 127B with second center ground part 102*e* is shifted in the X direction so as to stably hold the posture of second center ground part 102*e*.

A plurality of engagement pieces 125*c* is disposed and bent inward in a U-shape at the upper part of receptacle shell 125. A plurality of engagement holes 125*d* is disposed at the side surface of receptacle shell 125. When engagement piece 125*c* is engaged with the outer wall forming first side fitting recess 124*b* and second side fitting recess 124*c* of receptacle insulator 124, and engagement hole 125*d* is engaged with engaging protrusion 124*d* of receptacle insulator 124, receptacle shell 125 is fit and fixed to receptacle insulator 124.

In addition, engagement piece 125*c* has a spring elasticity, and is brought into elastic contact with and electrically connected to first fixing part 102*f* and second fixing part 102*g* of second plug contact 102 when plug connector 100 and receptacle connector 120 are fit to each other.

A plurality of ground connection parts 125*e* is provided at the lower portion of receptacle shell 125, and grounded to antenna module board PCB by soldering, for example.

Receptacle insulator 124 has a rectangular shape in plan view as viewed from the Z direction, and forms a housing of receptacle connector 120. Receptacle insulator 124 includes center fitting recess 124*a*, first side fitting recess 124*b* and second side fitting recess 124*c*, and can be fit to plug insulator 104. Center fitting recess 124*a* is provided along the X direction, and is fit to center fitting protrusion 104*c* of plug insulator 104. First side fitting recess 124*b* is provided in parallel to center fitting recess 124*a* on both sides of center fitting recess 124*a* in the Y direction, and fit to first side fitting protrusion 104*d* of plug insulator 104. Second side fitting recess 124*c* is provided to couple first side fitting recess 124*b* on both sides of center fitting recess 124*a* in the X direction, and fit to second side fitting protrusion 104*e* of plug insulator 104.

First receptacle contact 121, second receptacle contact 122, third receptacle contact 123 and receptacle shell 125 are assembled to receptacle insulator 124. First receptacle contact 121, second receptacle contact 122 and third receptacle contact 123 are formed integrally with receptacle insulator 124 by insert molding, for example. Receptacle shell 125 is fit to the peripheral portion of receptacle insulator 124.

As described above, in connector set 1 according to the first embodiment, plug connector 100 is an electric wire-to-board connector that connects antenna module board PCB and connection object cable 10 including inner conductor 11*a* of coaxial cable 11 used for transmission of radio frequency signals (first conductive path), outer shield layer 11*b* of coaxial cable 11 used for the shield (second conductive path) and six discrete cables 12 (third conductive path) when fit to receptacle connector 120 (mating connector) mounted in antenna module board PCB (circuit board).

Plug connector 100 includes first plug contact 101 (first contact) including first contact point part 101*a* connected to first receptacle contact 121 (first mating contact) and first connection part 101*b* connected to inner conductor 11*a* of coaxial cable 11, second plug contact 102 (second contact) including shield connection part 102*b* connected to outer shield layer 11*b* of coaxial cable 11, a plurality of third plug contacts 103 (third contact) including third contact point part 103*a* connected to third receptacle contact 123 (third mating contact) and third connection part 103*b* connected to discrete cable 12, plug insulator 104 (insulator) to which first plug contact 101, second plug contact 102 and third plug contact 103 are assembled, and the cable holding part that holds connection object cable 10 so as to be drawn out in the pitch direction as the arrangement direction of third contact point part 103*a*. In the first embodiment, connection object cable 10 is held by molding 107.

More specifically, plug connector 100 includes a plurality of first plug contacts 101 and a plurality of third plug contacts 103, and a plurality of first connection parts 101*b* and a plurality of third connection parts 103*b* are each disposed side by side in the Y direction orthogonal to the fitting direction and the pitch direction.

In plug connector 100, connection object cable 10 is drawn out from plug connector 100 such that the pitch direction of plug connector 100 and the extending direction of connection object cable 10 coincide with each other. In this manner, when plug connector 100 and receptacle connector 120 are fit to each other, the extending direction of connection object cable 10 can coincide with the extending direction of antenna module board PCB. Thus, the space-saving of the in-equipment wiring can be achieved, and the size reduction of communication devices can be supported.

In addition, in plug connector 100, second plug contact 102 includes contact-to-contact shielding part 102*a* disposed between first contact point part 101*a* and third contact point part 103*a*, first contact point part 101*a*, contact-to-contact shielding part 102*a* and a plurality of third contact point parts 103*a* are disposed side by side in this order in the pitch direction to form connector contact point parts 111 and 112, and two connector contact point parts 111 and 112 are disposed in two lines facing each other with the pitch direction along center line CL sandwiched therebetween. In this manner, with contact-to-contact shielding part 102*a* having the ground potential disposed between first contact point part 101*a* and third contact point part 103*a*, the part between first plug contact 101 and third plug contact 103 is shielded, thus improving the signal transmission characteristics.

In addition, in plug connector 100, two connector contact point parts 111 and 112 are disposed such that first contact point part 101*a*, contact-to-contact shielding part 102*a* and the plurality of third contact point parts 103*a* are line-symmetric with respect to center line CL. In this case, first plug contact 101, second plug contact 102 and third plug contact 103 can have a symmetric structure, thus increasing the ease of the design and manufacture of the components. In addition, with first contact point part 101*a* disposed on the side opposite to connection object cable 10, i.e., on the inside of antenna module board PCB (a position separated from end portion), the length of the conductor pattern of antenna module board PCB used for radio frequency signal transmission lines can be reduced, and thus the transmission loss can be reduced.

In addition, in plug connector 100, second plug contact 102 includes first center ground part 102*d* and second center ground part 102*e* (center ground part) disposed between two connector contact point parts 111 and 112. In this manner, the part between the contacts facing each other in the Y direction is shielded, thus further improving the signal transmission characteristics. In particular, in the first embodiment, two first contact point parts 101*a* face each other and are close to each other in the Y direction, but the part between them is shielded with first center ground part 102*d*, and thus the cross talk between the two radio frequency signal transmission lines can be suppressed.

In addition, in plug connector 100, first connection part 101*b*, shield connection part 102*b* (second connection part) and third connection part 103*b* are disposed to overlap the fitting region fit to receptacle connector 120 (mating connector) in the fitting direction. In this manner, the length of plug connector 100 in the longitudinal direction can be reduced, and the size of plug connector 100 can be reduced.

In addition, in plug connector 100, first plug contact 101 includes first relaying part 101*c* that couples first contact point part 101*a* and first connection part 101*b*, and third plug contact 103 includes third relaying part 103*c* that couples third contact point part 103*a* and third connection part 103*b*. In plan view as viewed from the fitting direction, first relaying part 101*c* and third relaying part 103*c* have respective shapes extended in the Y direction orthogonal to the fitting direction and the pitch direction from first contact point part 101*a* and third contact point part 103*a*, and bent and extended in the X direction (the pitch direction) to first connection part 101*b* and third connection part 103*b*. In this manner, first connection part 101*b* and the plurality of third connection parts 103*b* can be easily disposed side by side in the Y direction, and coaxial cable 11 and discrete cable 12 as connection object cable 10 can be connected to plug connector 100 so as to extend in the pitch direction.

In addition, in plug connector 100, first connection part 101*b*, shield connection part 102*b* and third connection part 103*b* are disposed in two stages differing in the fitting direction. In this manner, in comparison with the case where connection object cable 10 is disposed in one stage, the arrangement width of connection object cable 10 can be reduced, and thus the width of plug connector 100 can be easily set to a width equal to or smaller than antenna module board PCB.

Second Embodiment

Figure 9A:
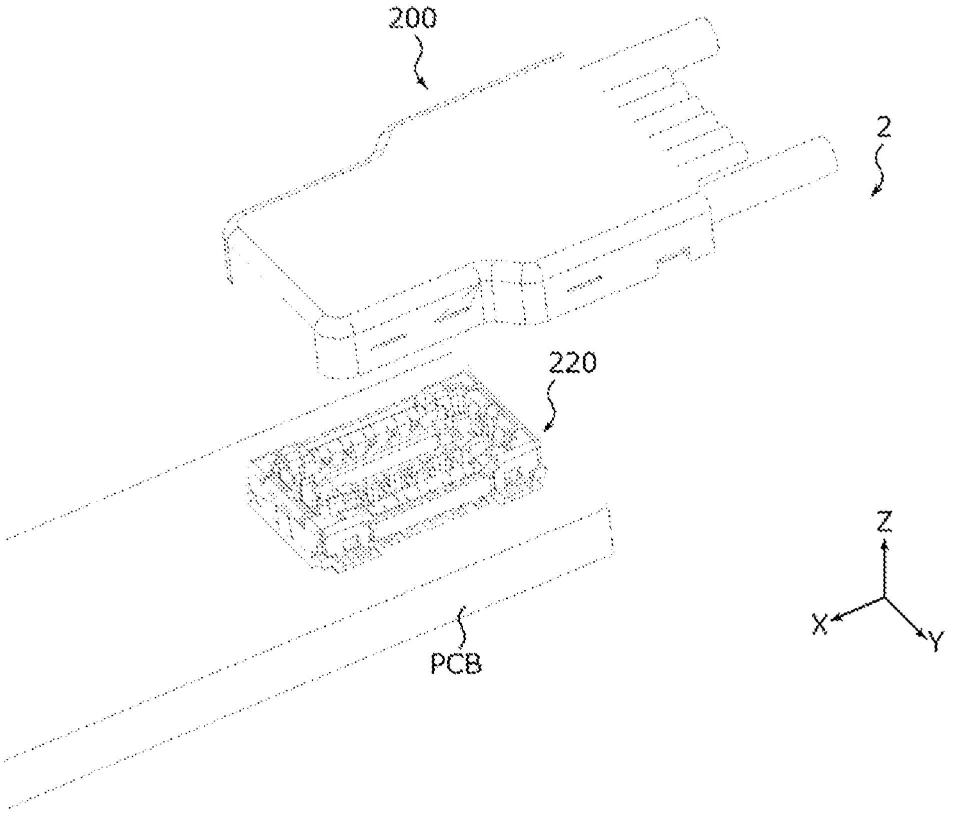
FIGS. 9A and 9B are perspective views illustrating an external appearance of a plug connector according to a second embodiment.
Figure 9B:
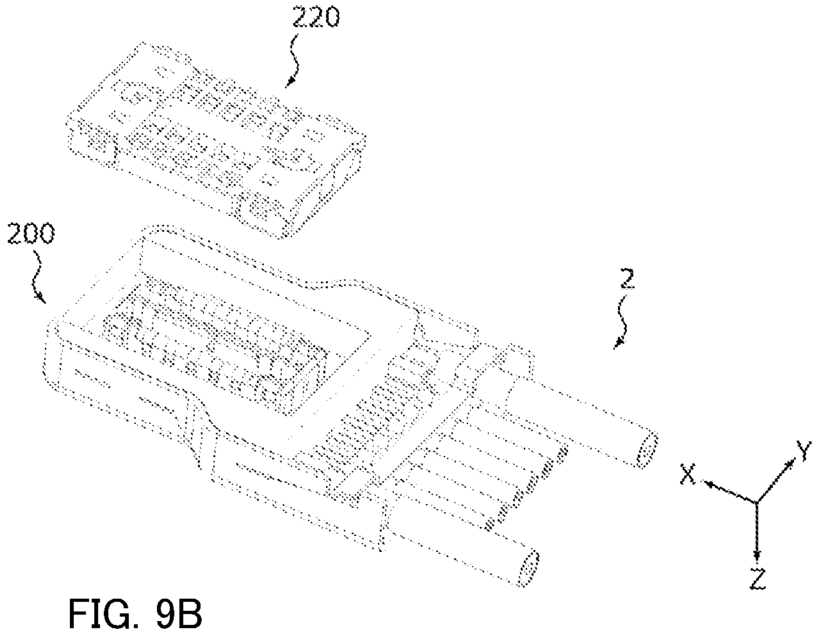

FIGS. 9A and 9B are perspective views illustrating an external appearance of connector set 2 according to a second embodiment of the present invention. FIGS. 9A and 9B illustrate a state where connector set 2 is disassembled, i.e., a state before plug connector 200 and receptacle connector 220 are fit to each other. Note that in FIG. 9B, the illustration of antenna module board PCB where receptacle connector 220 is mounted is omitted.

As illustrated in FIGS. 9A and 9B, connector set 2 includes plug connector 200 and receptacle connector 220. Connector set 2 is mounted as an in-equipment wiring of a next-generation mobile communication-compatible communication device (not illustrated) such as 5G-compatible smartphones, for example.

In connector set 2, the configuration of receptacle connector 220 is substantially the same as that of the receptacle connector according to the first embodiment 120 except for the pin assign, and therefore a configuration of plug connector 200 is elaborated below. Note that for the components of receptacle connector 220, the same reference numerals as those of the components of the receptacle connector according to the first embodiment 120 are used.

Plug connector 200 is attached to one end of connection object cable 20 and used as a connector-equipped cable. The other end of connection object cable 20 is connected to a main board (not illustrated) of a communication device, for example. Receptacle connector 220 is mounted at antenna module board PCB of a communication device.

The present embodiment describes a case where connection object cable 20 is composed of two first coaxial cables 21 and six second coaxial cables 22. Note that for connection object cable 20, flat cables such as flexible flat cables (FFC) and flexible printed circuit boards (FPC) are applicable. In the present embodiment, connection object cable 20 is connected to plug connector 200 in the same stage in the Z direction, and therefore a single flat cable is applied. This case uses a flexible flat cable with a 2-layer structure or a 3-layer structure in which the first conductive path and the third conductive path are disposed at the conductor layer, and the ground layer formed at one surface or both surfaces of the conductor layer is the second conductive path.

First coaxial cable 21 includes inner conductor 21*a* (first conductive path), and outer shield layer 21*b* (second conductive path) disposed outside inner conductor 21*a* through an insulator (whose reference numeral is omitted). Inner conductor 21*a* of first coaxial cable 21 is used for transmission of radio frequency signals. As with first coaxial cables 21, second coaxial cable 22 includes inner conductor 22*a* (third conductive path) and outer shield layer 22*b* (second conductive path). Inner conductor 22*a* of second coaxial cable 22 is used as a power line (power source line), a control line, or a signal line.

Connector set 2 electrically connects connection object cable 20 and antenna module board PCB through fitting of plug connector 200 and receptacle connector 220. More specifically, inner conductor 21*a* of first coaxial cable 21 and inner conductor 22*a* of second coaxial cable 22 are electrically connected to the conductor pattern (not illustrated) of antenna module board PCB through first plug contact 201 and third plug contact 203 of plug connector 200 and first receptacle contact 121 and third receptacle contact 123 of receptacle connector 220. In addition, outer shield layer 21*b* of first coaxial cable 21 and outer shield layer 22*b* of second coaxial cable 22 are grounded to antenna module board PCB through second plug contact 202 of plug connector 200 and second receptacle contact 122 and receptacle shell 125 of receptacle connector 220.

In connector set 2, receptacle connector 220 is mounted on antenna module board PCB such that the extending direction of antenna module board PCB and the pitch direction of receptacle connector 220 coincide with the X direction, for example. In this case, in comparison with the mounted state where the width direction of antenna module board PCB and the pitch direction of receptacle connector 220 coincide with the Y direction, the width of antenna module board PCB can be reduced, and the space-saving of the in-equipment wiring can be achieved.

In addition, connection object cable 20 is drawn out from plug connector 200 such that the pitch direction of plug connector 200 and the extending direction of connection object cable 20 coincide with the X direction. In addition, the width of plug connector 200 in the Y direction is set to be equal to or smaller than the width of antenna module board PCB. In this manner, when plug connector 200 and receptacle connector 220 are fit to each other, the extending direction of connection object cable 20 can coincide with the extending direction of antenna module board PCB. Then, in comparison with the case where connection object cable 20 extends in the direction (the Y direction) orthogonal to the fitting direction and the pitch direction, i.e., connection object cable 20 extends in the direction at 90° with respect to the extending direction of antenna module board PCB, the space-saving of the in-equipment wiring can be achieved. Thus, connector set 2 is very useful for reducing the size of communication devices.

Figure 10:
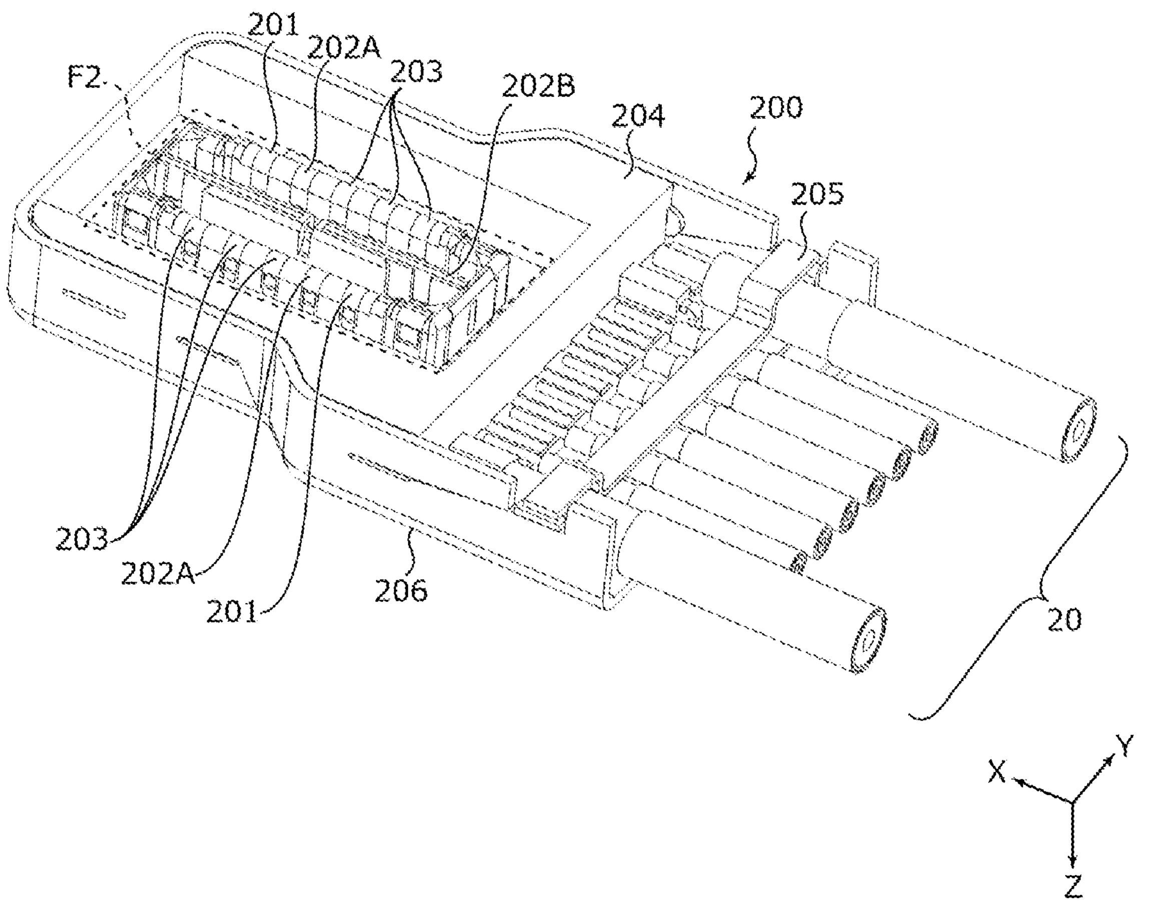
FIG. 10 is an exploded perspective view illustrating the plug connector according to the second embodiment.

FIG. 10 is a perspective view illustrating an external appearance of plug connector 200. FIG. 10 is a perspective view illustrating an external appearance of plug connector 200 as viewed from the – side (hereinafter referred to as "the fitting side") in the Z direction on which it is fit to receptacle connector 220.

Figure 11:
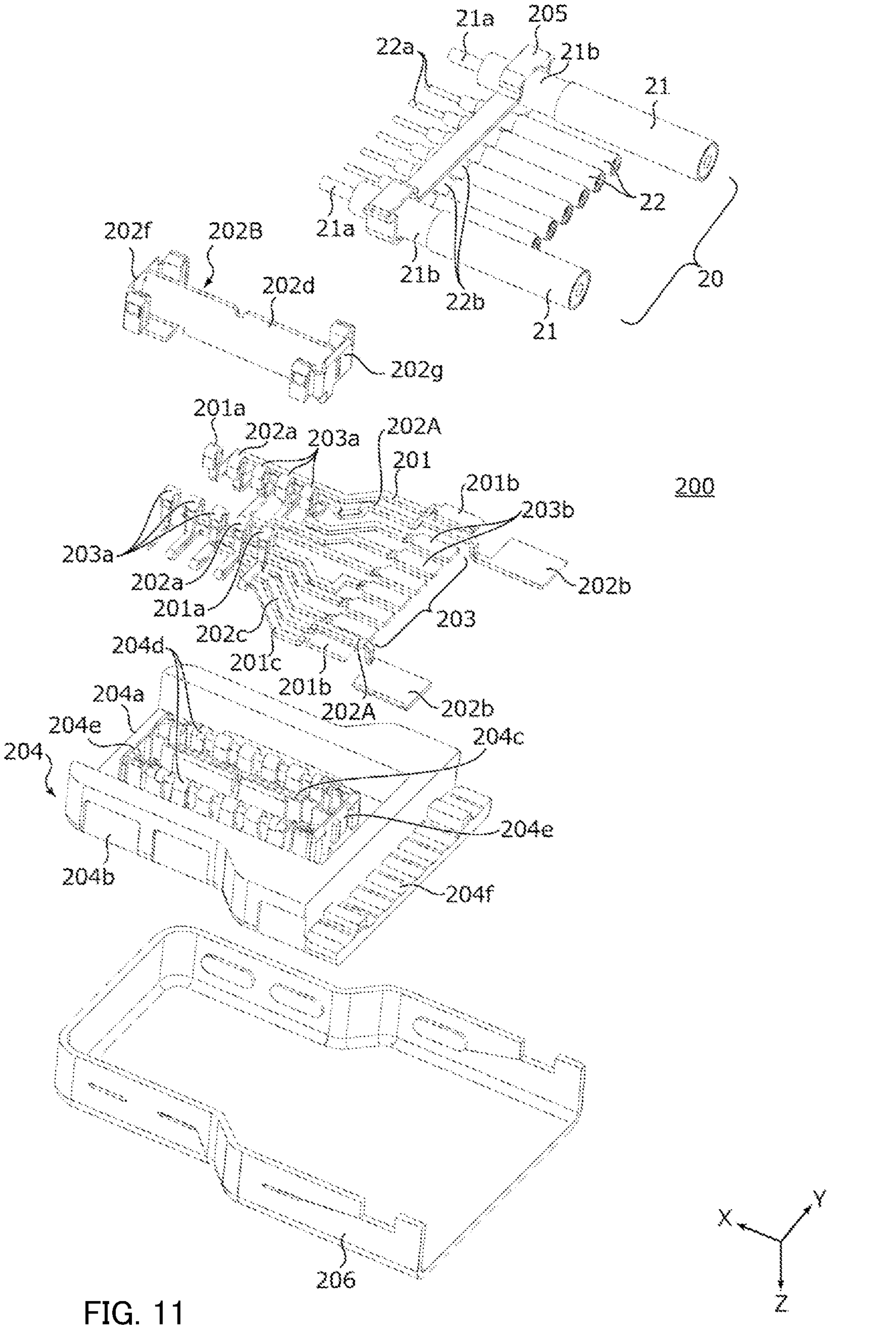
FIG. 11 is an exploded perspective view illustrating the plug connector according to the second embodiment.

FIG. 11 is an exploded perspective view illustrating plug connector 200. FIG. 11 is an exploded perspective view as viewed from the fitting side.

Figure 12A:
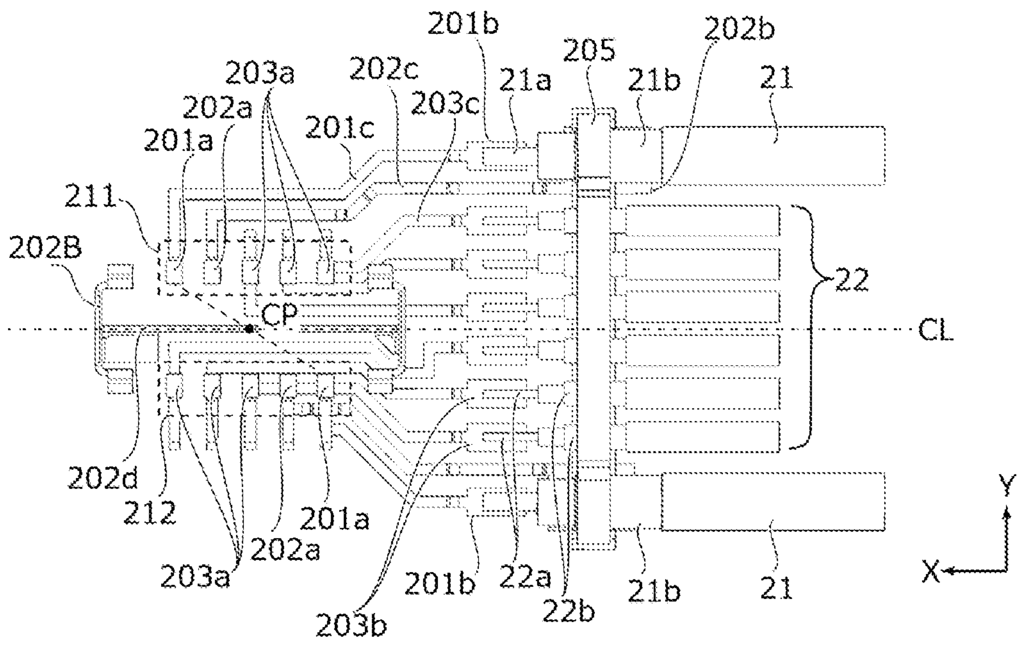
FIGS. 12A and 12B are diagrams illustrating wiring inside the plug connector according to the second embodiment.
Figure 12B:
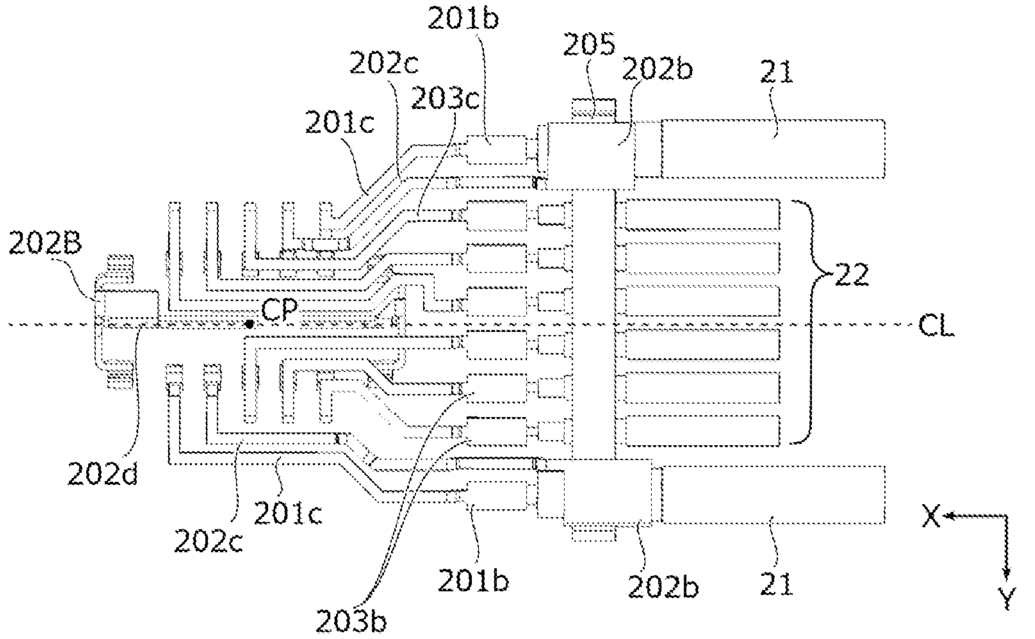

FIGS. 12A and 12B are diagrams illustrating wiring inside plug connector 200, and the illustration of plug insulator 204 and plug cover 206 is omitted. FIG. 12A is a plan view as viewed from the fitting side, and FIG. 12B is a bottom view as viewed from the opposite side.

As illustrated in FIGS. 10 and 11, plug connector 200 includes first plug contact 201, second plug contacts 202A and 202B, third plug contact 203, plug insulator 204 and plug cover 206. First plug contact 201, second plug contacts 202A and 202B and third plug contact 203 are formed of a conductive material such as metal (e.g., a copper alloy). Plug insulator 204 is formed of an insulating material such as a synthetic resin (e.g., liquid crystal polymer).

In FIG. 10, region F2 surrounded by the broken line is the fitting region of plug connector 200 as viewed from the fitting direction, i.e., the region where it is fit to receptacle connector 220 (hereinafter referred to as "fitting region F2"). In the present embodiment, first connection part 201*b* of first plug contact 201, shield connection part 202*b* of second plug contact 202 and third connection part 203*b* of third plug contact 203 are formed outside fitting region F2 in the pitch direction.

First plug contact 201 includes first contact point part 201*a*, first connection part 201*b*, and first relaying part 201*c* that connects first contact point part 201*a* and first connection part 201*b*.

When plug connector 200 and receptacle connector 220 are fit to each other, first contact point part 201*a* is brought into contact with and electrically connected to first contact point part 121*a* of receptacle connector 220. More specifically, first contact point part 201*a* is folded-back in a U-shape toward the inside, and is provided with an engaging protrusion (whose reference numeral is omitted) that engages with an engaging recess (whose reference numeral is omitted) of first receptacle contact 121 at the outer surface of the end portion. Two first contact point parts 201*a* are disposed in a point symmetrical manner with respect to center point CP on center line CL extending along the X direction.

First connection part 201*b* is formed in a flat plate shape, and inner conductor 21*a* of first coaxial cable 21 exposed at the step-stripped tip end portion is connected to it from the – side in the Z direction by soldering, for example (see FIGS. 12A and 12B). Two first connection parts 201*b* are disposed side by side in the Y direction orthogonal to the Z direction as the fitting direction and the X direction as the pitch direction. First relaying part 201*c* substantially perpendicularly extends toward the + side in the Z direction from first contact point part 201*a*, and bent and extended in the Y direction, and then, extended in the X direction. First relaying part 201*c* is formed in a skewed manner as necessary such that two first connection parts 201*b* are located outside third connection part 203*b* in the Y direction.

Second plug contacts 202A and 202B are members connected to outer shield layer 21*b* of first coaxial cable 21 and outer shield layer 22*b* of second coaxial cable 22, and are electrically grounded to antenna module board PCB through second receptacle contact 122 and receptacle shell 125 of receptacle connector 220. Second plug contact 202A is connected to outer shield layers 21*b* and 22*b*. Second plug contact 202B is a ground plate that shields between connector contact point parts 211 and 212, and is electrically connected to second plug contact 202A. Second plug contact 202B is formed by processing a single metal sheet, for example. Note that as in the first embodiment, second plug contacts 202A and 202B may be composed of a single member.

Second plug contact 202A includes contact-to-contact shielding part 202*a* and shield connection part 202*b*. Contact-to-contact shielding part 202*a* and shield connection part 202*b* are coupled by second relaying part 202*c*. Second plug contact 202B includes center ground part 202*d*, first fixing part 202*f* and second fixing part 202*g*.

Contact-to-contact shielding part 202*a* is disposed between first contact point part 201*a* of first plug contact 201 and third contact point part 203*a* of third plug contact 203. In the present embodiment, contact-to-contact shielding part 202*a* is brought into contact with and electrically connected to second receptacle contact 122 of receptacle connector 220 when plug connector 200 and receptacle connector 220 are fit to each other. More specifically, contact-to-contact shielding part 202*a* is folded-back in a U-shape toward the inside, and provided with an engaging protrusion (whose reference numeral is omitted) that engages with an engaging recess (whose reference numeral is omitted) of second receptacle contact 122 at the outer surface of the end portion. Two contact-to-contact shielding parts 202*a* is disposed in a point symmetrical manner with respect to center point CP on center line CL extending along the X direction.

Shield connection part 202*b* is formed in a flat plate shape, and is electrically connected to outer shield layer 21*b* of first coaxial cable 21 and outer shield layer 22*b* of second coaxial cable 22 through ground bar 205 (see FIGS. 12A and 12B). Two shield connection parts 202*b* are disposed side by side in the Y direction orthogonal to the Z direction as the fitting direction and the X direction as the pitch direction. Ground bar 205 sandwiches outer shield layer 21*b* of first coaxial cable 21 and outer shield layer 22*b* of second coaxial cable 22 exposed at the step-stripped tip end portion, and is connected by soldering, for example. In addition, ground bar 205 is connected to shield connection part 202*b* from the – side in the Z direction by soldering, for example. Second relaying part 202*c* substantially perpendicularly extends toward the + side in the Z direction from contact-to-contact shielding part 202*a*, and bent and extended in the Y direction, and, extended in the X direction. Second relaying part 202*c* is formed in a skewed manner as necessary such that two shield connection parts 202*b* can be drawn to the – side in the X direction through the gap of first connection part 201*b* and third connection part 203*b* in the Y direction.

Center ground part 202*d* has a flat plate shape extending in the XZ plane. First fixing part 202*f* is disposed at an end portion of center ground part 202*d* on the + side in the X direction, and second fixing part 202*g* is disposed at an end portion center ground part 202*d* on the + side in the X direction.

Third plug contact 203 includes third contact point part 203*a*, third connection part 203*b*, and third relaying part 203*c* that connects third contact point part 203*a* and third connection part 203*b*.

Third contact point part 203*a* is brought into contact with and electrically connected to third contact point part 123*a* of receptacle connector 220 when plug connector 200 and receptacle connector 220 are fit to each other. More specifically, third contact point part 203*a* is folded-back in a U-shape toward the inside, and is provided with an engaging protrusion (whose reference numeral is omitted) that engages with an engaging recess (whose reference numeral is omitted) of third receptacle contact 123 at the outer surface of the end portion.

Third connection part 203*b* is formed in a flat plate shape, and inner conductor 22*a* of second coaxial cable 22 is connected to it from the – side in the Z direction by soldering, for example. Together with two first connection parts 201*b*, six third connection parts 203*b* are disposed side by side in the Y direction orthogonal to the Z direction as the fitting direction and the X direction as the pitch direction. Note that first connection part 201*b* and third connection part 203*b* may be shifted from one another in a staggered manner in the X direction as long as they are disposed side by side in the Y direction as a whole, for example. Third relaying part 203*c* substantially perpendicularly extends toward the + side in the Z direction from third contact point part 203*a*, and is bent in the Y direction and extended inward, and then, extended in the X direction. Third relaying part 203*c* is formed in a skewed manner as necessary such that six third connection parts 203*b* are disposed side by side in the Y direction.

Plug insulator 204 forms the housing of plug connector 200 together with plug cover 206. Plug insulator 204 includes base part 204*a*, side wall part 204*b*, center fitting protrusion 204*c*, first side fitting protrusion 204*d*, second side fitting protrusion 204*e* and contact attaching portion 204*f*.

Base part 204*a* has a substantially rectangular shape extending in the XY plane in plan view as viewed from the Z direction. In the present embodiment, in accordance with the arrangement width of connection object cable 20 (the width in the Y direction), plug insulator 204 is wider on the – side in the X direction than on the + side in the X direction.

Side wall part 204*b* is formed upright to the – side in the Z direction from the three sides of base part 204*a*, and surrounds fitting region F2 including center fitting protrusion 204*c*, first side fitting protrusion 204*d* and second side fitting protrusion 204*e*.

Center fitting protrusion 204*c*, first side fitting protrusion 204*d* and second side fitting protrusion 204*e* are portions fit to receptacle connector 220, and are provided to protrude to the fitting side from base part 204*a*. Center fitting protrusion 204*c* has a flat plate shape extending in the XZ plane, and provided upright at the surface of base part 204*a* on the fitting side. First side fitting protrusion 204*d* and second side fitting protrusion 204*e* are provided upright to surround center fitting protrusion 204*c*, forming a rectangular frame part at the surface of base part 204*a* on the fitting side.

Contact attaching portion 204*f* is disposed outside fitting region F2 in the pitch direction. First connection part 201*b* of first plug contact 201 and third connection part 203*b* of third plug contact 203 are disposed at contact attaching portion 204*f*.

First plug contact 201, second plug contacts 202A and 202B and third plug contact 203 are assembled to plug insulator 204. First plug contact 201, second plug contacts 202A and 202B and third plug contact 203 are formed integrally with plug insulator 204 by insert molding, for example. First plug contact 201, second plug contacts 202A and 202B and third plug contact 203 are separated from each other and are electrically isolated from each other by plug insulator 204.

First contact point part 201*a* of first plug contact 201, contact-to-contact shielding part 202*a* of second plug contact 202A and third contact point part 203*a* of third plug contact 203 are disposed at first side fitting protrusion 204*d* of plug insulator 204, with the surface exposed. First connection part 201*b* of first plug contact 201 and third connection part 203*b* of third plug contact 203 are disposed by being drawn to contact attaching portion 204*f* of plug insulator 204. Shield connection part 202*b* of second plug contact 202A is drawn to the – side in the X direction than contact attaching portion 204*f*, and disposed at plug cover 206.

Center ground part 202*d* of second plug contact 202B is disposed at center fitting protrusion 204*c* of plug insulator 204, with the surface exposed at least in part (the part where it makes contact with receptacle shell 125 of receptacle connector 220). First fixing part 202*f* and second fixing part 202*g* of second plug contact 202B are disposed at second side fitting protrusion 204*e* of plug insulator 204, with the outer surface exposed.

Plug cover 206 is a protector that forms the housing of plug connector 200 together with plug insulator 204, and is disposed to cover the side surface of plug insulator 204. Preferably, plug cover 206 is formed of a metal conductive material. In this case, by electrically connecting plug cover 206 to second plug contacts 202A and 202B to have the ground potential, it can function as a shield. Note that as with plug insulator 204, plug cover 206 may be formed of an insulating material such as a synthetic resin.

Plug insulator 204 is housed inside plug cover 206. The length of plug cover 206 in the X direction is greater than the length of plug insulator 204, and the portion on the – side in the X direction can hold connection object cable 20. That is, plug cover 206 serves as a cable holding part, and holds the end portion of connection object cable 20.

Note that after connection object cable 20 is connected to plug connector 200, a molding may be formed by injecting and curing mold resin covering the connecting portion, so as to reinforce the connecting portion of connection object cable 20.

Mainly, first coaxial cable 21 and second coaxial cable 22 are held by plug cover 206 in the state where they are disposed in the same stage in the fitting direction. In this manner, in comparison with a case where the connection object cable 20 is arranged in a plurality of stages (see, e.g., the first embodiment), the height of connection object cable 20 in the fitting direction is reduced, and thus the height of plug connector 200 can be reduced. In addition, in the case where flat cable is applied as connection object cable 20, a single flat cable including the first conductive path, the second conductive path and the third conductive path is connected, and thus the ease of the cable connection operation is increased.

In the second embodiment, the pin assign in plug connector 200 is as follows.

Specifically, first contact point part 201*a* of first plug contact 201, contact-to-contact shielding part 202*a* of second plug contact 202A and third contact point part 203*a* of third plug contact 203 are disposed side by side in this order in the X direction as the pitch direction, thus forming two connector contact point parts 211 and 212 (see FIG. 12A).

Connector contact point parts 211 and 212 are disposed in two lines facing each other with center line CL extending along the X direction interposed therebetween. In addition, connector contact point parts 211 and 212 are disposed such that first contact point part 201*a*, contact-to-contact shielding part 202*a* and three third contact point parts 203*a* are disposed in a point symmetrical manner with respect to center point CP on center line CL extending along the X direction.

With contact-to-contact shielding part 202*a* having the ground potential disposed between first contact point part 201*a* and third contact point part 203*a*, the part between first contact point part 201*a* and third contact point part 203*a* is shielded. In addition, with center ground part 202*d* of second plug contact 202B disposed between connector contact point parts 211 and 212, the part between connector contact point parts 211 and 212 is shielded.

In this manner, the EMS characteristics in the transmission line can be improved, and a favorable transmission quality can be ensured. In particular, in the present embodiment, two first contact point parts 201*a* are located at opposite corners of the rectangle defining fitting region F2, and they are more separated from each other in comparison with a case where they are facing in the Y direction, and thus arranged to be least affected by each other. In this manner, the cross talk between the two radio frequency signal transmission lines can be suppressed.

As described above, in the connector set according to the second embodiment 2, plug connector 200 is an electric wire-to-board connector that connects antenna module board PCB and connection object cable 20 including inner conductor 21*a* of first coaxial cable 21 used for transmission of radio frequency signals (first conductive path), outer shield layers 21*b* and 22*b* of first coaxial cable 21 and second coaxial cable 22 used for the shield (second conductive path) and inner conductor 22*a* of six second coaxial cables 22 (third conductive path) when fit to receptacle connector 220 (mating connector) mounted in antenna module board PCB (circuit board).

Plug connector 200 includes first plug contact 201 (first contact) including first contact point part 201*a* connected to first receptacle contact 121 (first mating contact) and first connection part 201*b* connected to inner conductor 21*a* of first coaxial cable 21, second plug contact 202A (second contact) including shield connection part 202*b* (second connection part) connected to outer shield layers 21*b* and 22*b* of first coaxial cable 21 and second coaxial cable 22, a plurality of third plug contacts 203 (third contact) including third contact point part 203*a* connected to third receptacle contact 123 (third mating contact) and third connection part 203*b* connected to inner conductor 22*a* of second coaxial cable 22, plug insulator 204 (insulator) to which first plug contact 201, second plug contact 202A and third plug contact 203 are assembled, and the cable holding part that holds connection object cable 20 so as to be drawn out in the pitch direction as the arrangement direction of third contact point part 203*a*. In the second embodiment, connection object cable 20 is held by plug cover 206.

More specifically, plug connector 200 includes a plurality of first plug contacts 201 and a plurality of third plug contacts 203, and a plurality of first connection parts 201*b* and a plurality of third connection parts 203*b* are each disposed side by side in the Y direction orthogonal to the fitting direction and the pitch direction.

In plug connector 200, connection object cable 20 is drawn out from plug connector 200 such that the pitch direction of plug connector 200 and the extending direction of connection object cable 20 coincide with each other. In this manner, when plug connector 200 and receptacle connector 220 are fit to each other, the extending direction of connection object cable 20 can coincide with the extending direction of antenna module board PCB. Thus, the space-saving of the in-equipment wiring can be achieved, and the size reduction of communication devices can be supported.

In addition, in plug connector 200, second plug contact 202A includes contact-to-contact shielding part 202*a* disposed between first contact point part 201*a* and third contact point part 203*a*, first contact point part 201*a*, contact-to-contact shielding part 202*a* and a plurality of third contact point parts 203*a* are disposed side by side in this order in the pitch direction to form connector contact point parts 211 and 212, and two connector contact point parts 211 and 212 are disposed in two lines facing each other with the pitch direction along center line CL sandwiched therebetween. In this manner, with contact-to-contact shielding part 202*a* having the ground potential disposed between first contact point part 201*a* and third contact point part 203*a*, the part between first plug contact 101 and third plug contact 103 is shielded, thus improving the signal transmission characteristics.

In addition, in plug connector 200, two connector contact point parts 211 and 212 are disposed such that first contact point part 201*a*, contact-to-contact shielding part 202*a* and the plurality of third contact point parts 203*a* are point symmetrical with respect to center point CP on center line CL. Two first contact point parts 201*a* are located at opposite corners of the rectangle defining fitting region F2, and thus arranged to be least affected by each other. In this manner, the cross talk between the two radio frequency signal transmission lines can be suppressed, thus further improving the signal transmission characteristics.

In addition, in plug connector 200, second plug contact 202B includes center ground part 202*d* disposed between two connector contact point parts 211 and 212. In this manner, the part between the contacts facing each other in the Y direction is shielded, thus further improving the signal transmission characteristics.

In addition, in plug connector 200, first connection part 201*b*, shield connection part 202*b* (second connection part) and third connection part 203*b* are disposed outside fitting region F2 fit to receptacle connector 220 (mating connector) in the pitch direction. That is, first connection part 201*b*, shield connection part 202*b* (second connection part) and third connection part 203*b* do not overlap fitting region F2 in the fitting direction. In this manner, in comparison with a case where the connection object cable is disposed to overlap the fitting region, the height of plug connector 200 can be reduced.

In addition, in plug connector 200, first plug contact 201 includes first relaying part 201*c* that couples first contact point part 201*a* and first connection part 201*b*, and third plug contact 203 includes third relaying part 203*c* that couples third contact point part 203*a* and third connection part 203*b*. In plan view as viewed from the fitting direction, first relaying part 201*c* and third relaying part 203*c* have respective shapes extended in the Y direction orthogonal to the fitting direction and the pitch direction from first contact point part 201*a* and third contact point part 203*a*, and bent and extended in the X direction (the pitch direction) to first connection part 201*b* and third connection part 203*b*. In this manner, first connection part 201*b* and the plurality of third connection parts 203*b* can be easily disposed side by side in the Y direction, and first coaxial cable 21 and second coaxial cable 22 as connection object cable 20 can be connected to plug connector 200 so as to extend in the pitch direction.

In addition, in plug connector 200, first connection part 201*b*, shield connection part 202*b* (second connection part) and third connection part 203*b* are disposed in the same stage in the fitting direction. In this manner, in comparison with the case where connection object cable 20 are disposed in two stages, the height of plug connector 200 can be reduced.

Third Embodiment

Figure 13A:
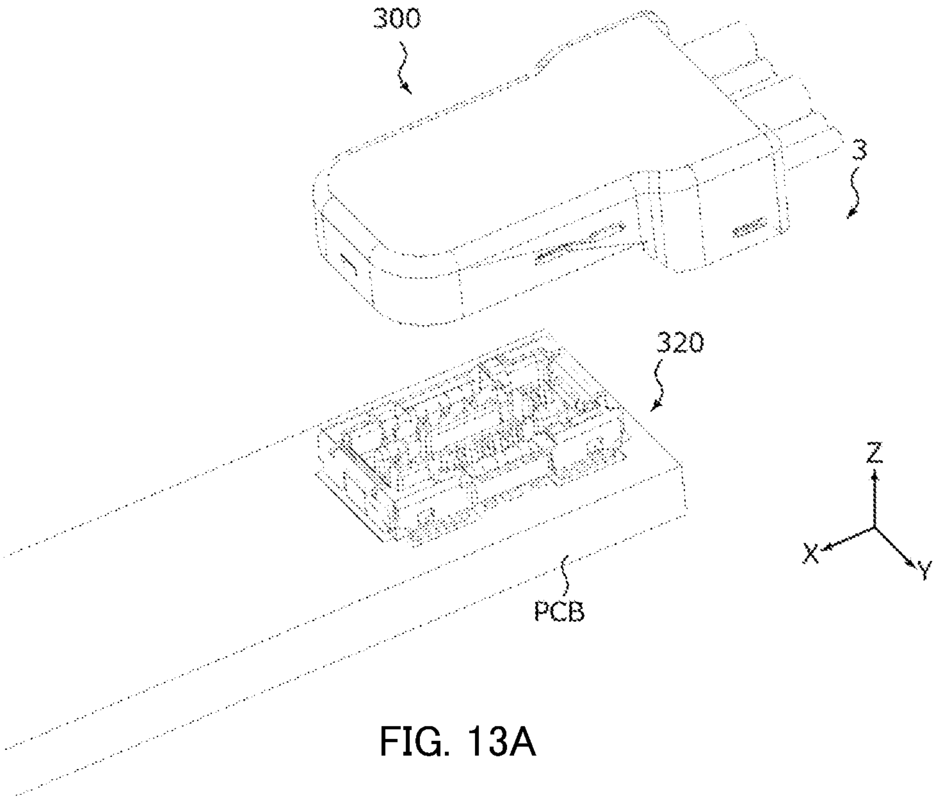
FIGS. 13A and 13B are perspective views illustrating an external appearance of a connector set according to a third embodiment.
Figure 13B:
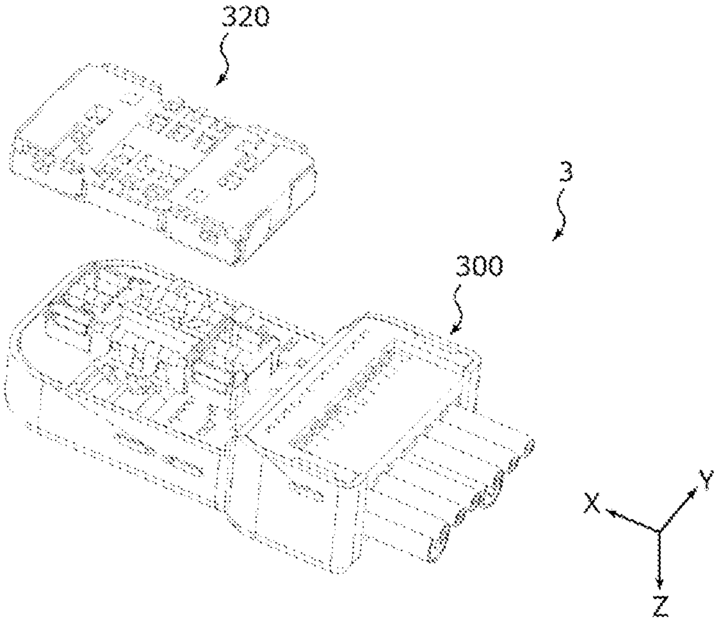

FIGS. 13A and 13B are perspective views illustrating an external appearance of connector set 3 according to the third embodiment of the present invention. FIGS. 13A and 13B illustrate a state where connector set 3 is disassembled, i.e., a state before plug connector 300 and receptacle connector 320 are fit to each other. Note that in FIG. 13B, the illustration of antenna module board PCB where receptacle connector 320 is mounted is omitted.

As illustrated in FIGS. 13A and 13B, connector set 3 includes plug connector 300 and receptacle connector 320. Connector set 3 is mounted as an in-equipment wiring of a next-generation mobile communication-compatible communication device (not illustrated) such as 5G-compatible smartphones, for example.

Plug connector 300 is attached to one end of connection object cable 30 and used as a connector-equipped cable. The other end of connection object cable 30 is connected to a main board (not illustrated) of a communication device, for example. Receptacle connector 320 is mounted at antenna module board PCB of a communication device.

In the present embodiment, connection object cable 30 is the same as that described in the second embodiment. That is, connection object cable 30 is composed of two first coaxial cables 31 and six second coaxial cables 32. Note that for connection object cable 30, flat cables such as flexible flat cables (FFC) and flexible printed circuit boards (FPC) are applicable. In the present embodiment, connection object cable 30 is connected to plug connector 300 in two stages differing in the Z direction to, i.e., two flat cables are applied.

First coaxial cable 31 includes inner conductor 31*a* (first conductive path), and outer shield layer 31*b* (second conductive path) disposed outside inner conductor 31*a* through an insulator (whose reference numeral is omitted). Inner conductor 31*a* of first coaxial cable 31 is used for transmission of radio frequency signals. As with first coaxial cable 31, second coaxial cable 32 includes inner conductor 32*a* (third conductive path) and outer shield layer 32*b* (second conductive path). Inner conductor 32*a* of second coaxial cable 32 is used as a power line (power source line), a control line, or a signal line.

Connector set 3 electrically connects connection object cable 30 and antenna module board PCB through fitting of plug connector 300 and receptacle connector 320. More specifically, inner conductor 31*a* of first coaxial cable 31 and inner conductor 32*a* of second coaxial cable 32 are electrically connected to the conductor pattern (not illustrated) of antenna module board PCB through first plug contact 301 and third plug contact 303 of plug connector 300 and first receptacle contact 321 and third receptacle contact 323 of receptacle connector 320. In addition, outer shield layer 31*b* of first coaxial cable 31 and outer shield layer 32*b* of second coaxial cable 32 are grounded to antenna module board PCB through second plug contact 302 of plug connector 300 and receptacle shell 325 of receptacle connector 320.

In connector set 3, receptacle connector 320 is mounted on antenna module board PCB such that the extending direction of antenna module board PCB and the pitch direction of receptacle connector 320 coincide with each other, for example. In this case, in comparison with the case where the width direction of antenna module board PCB and the pitch direction of receptacle connector 120 coincide with each other, the width of antenna module board PCB can be reduced, and the space-saving of the in-equipment wiring can be achieved.

In addition, connection object cable 30 is drawn out from plug connector 300 such that the pitch direction of plug connector 300 and the extending direction of connection object cable 30 coincide with the X direction. In addition, the width of plug connector 300 in the Y direction is set to be equal to or smaller than the width of antenna module board PCB. In this manner, when plug connector 300 and receptacle connector 320 are fit to each other, the extending direction of connection object cable 30 can coincide with the extending direction of antenna module board PCB. Then, in comparison with the case where connection object cable 30 extends in the direction (the Y direction) orthogonal to the fitting direction and the pitch direction, i.e., connection object cable 30 extends in the direction at 90° with respect to the extending direction of antenna module board PCB, the space-saving of the in-equipment wiring can be achieved. Thus, connector set 3 is very useful for reducing the size of communication devices.

Detailed configurations of plug connector 300 and receptacle connector 320 are described below.

Figure 14:
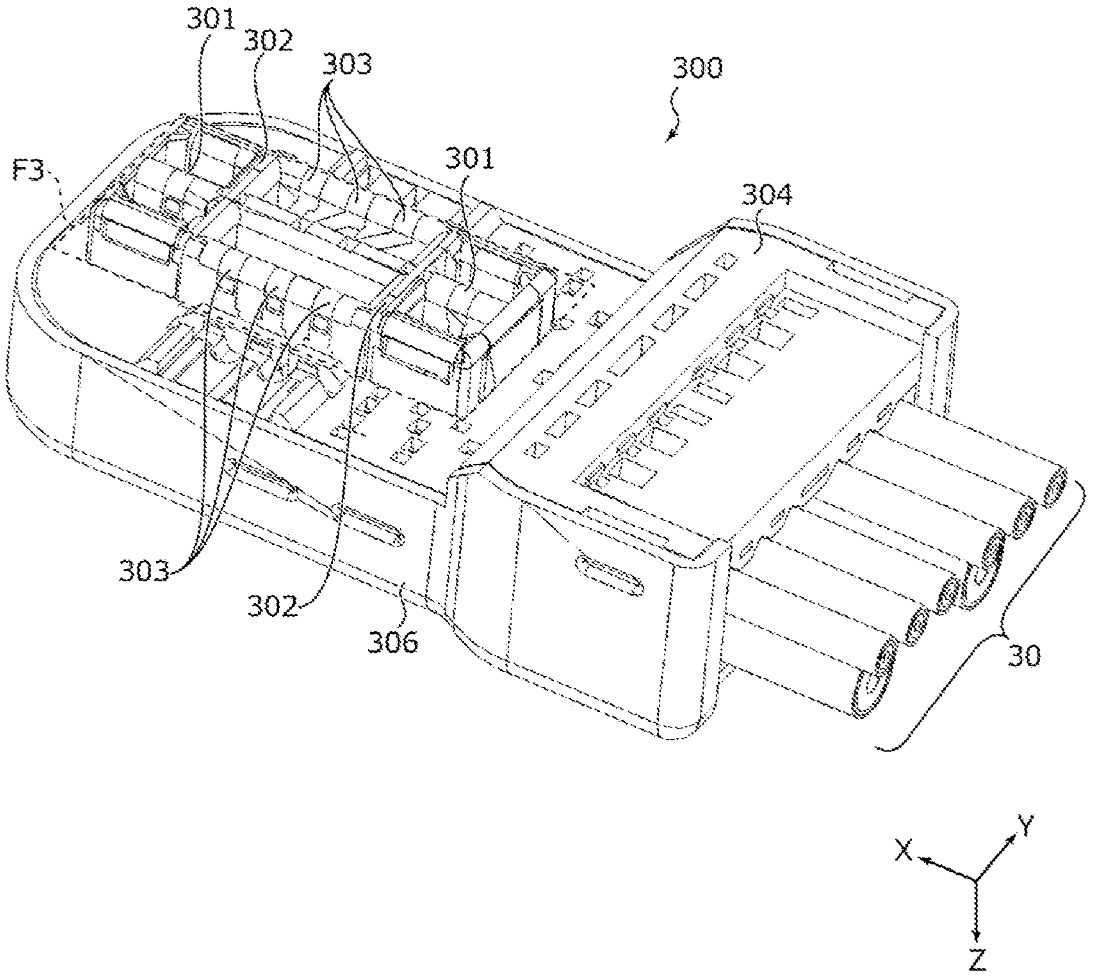
FIG. 14 is a perspective view illustrating an external appearance of a plug connector according to the third embodiment.

FIG. 14 is a perspective view illustrating an external appearance of plug connector 300. FIG. 14 is a perspective view illustrating an external appearance of plug connector 300 as viewed from the – side (hereinafter referred to as "the fitting side") in the Z direction on which it is fit to receptacle connector 320.

Figure 15:
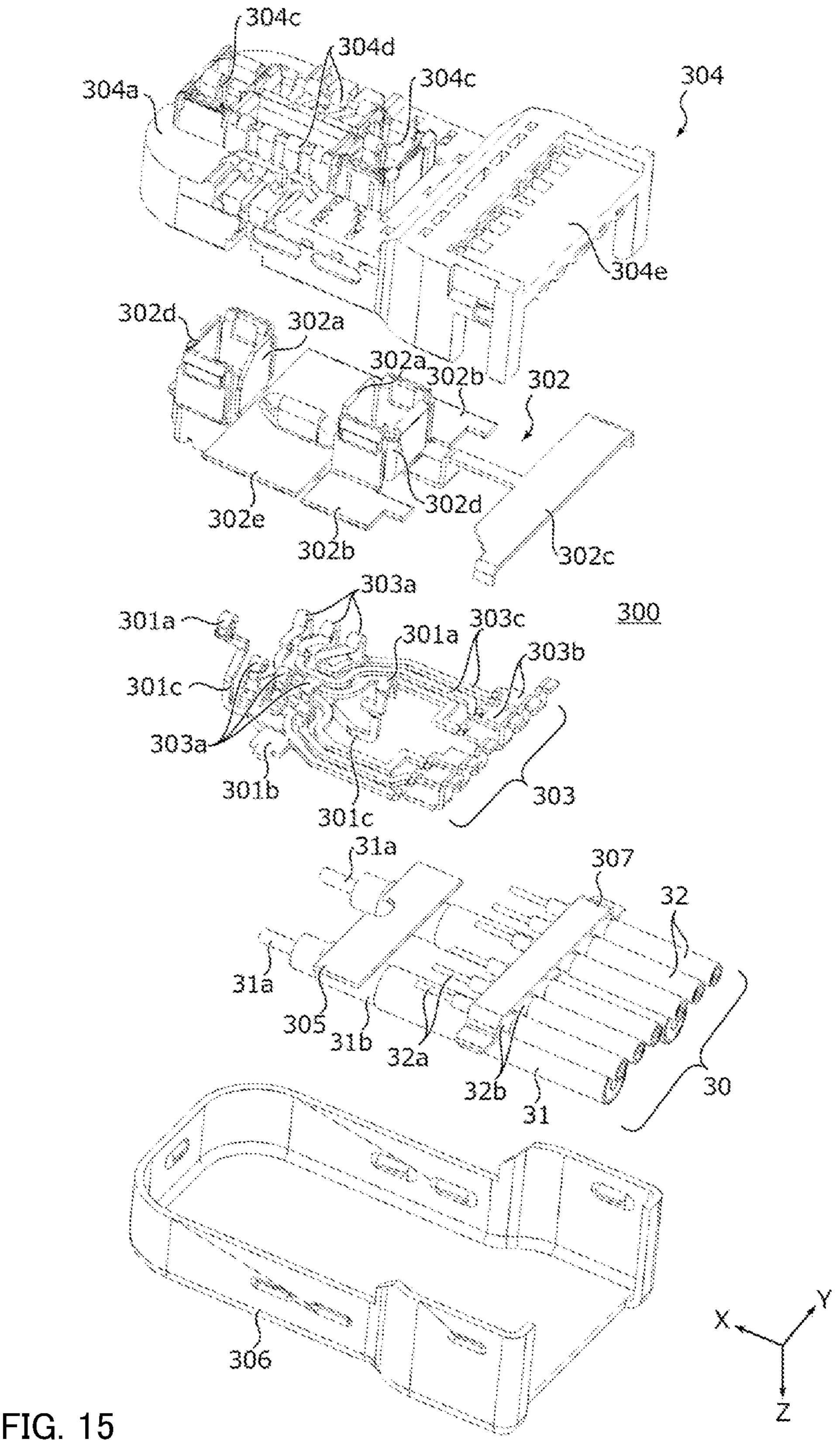
FIG. 15 is an exploded perspective view illustrating the plug connector according to the third embodiment.
Figure 16:
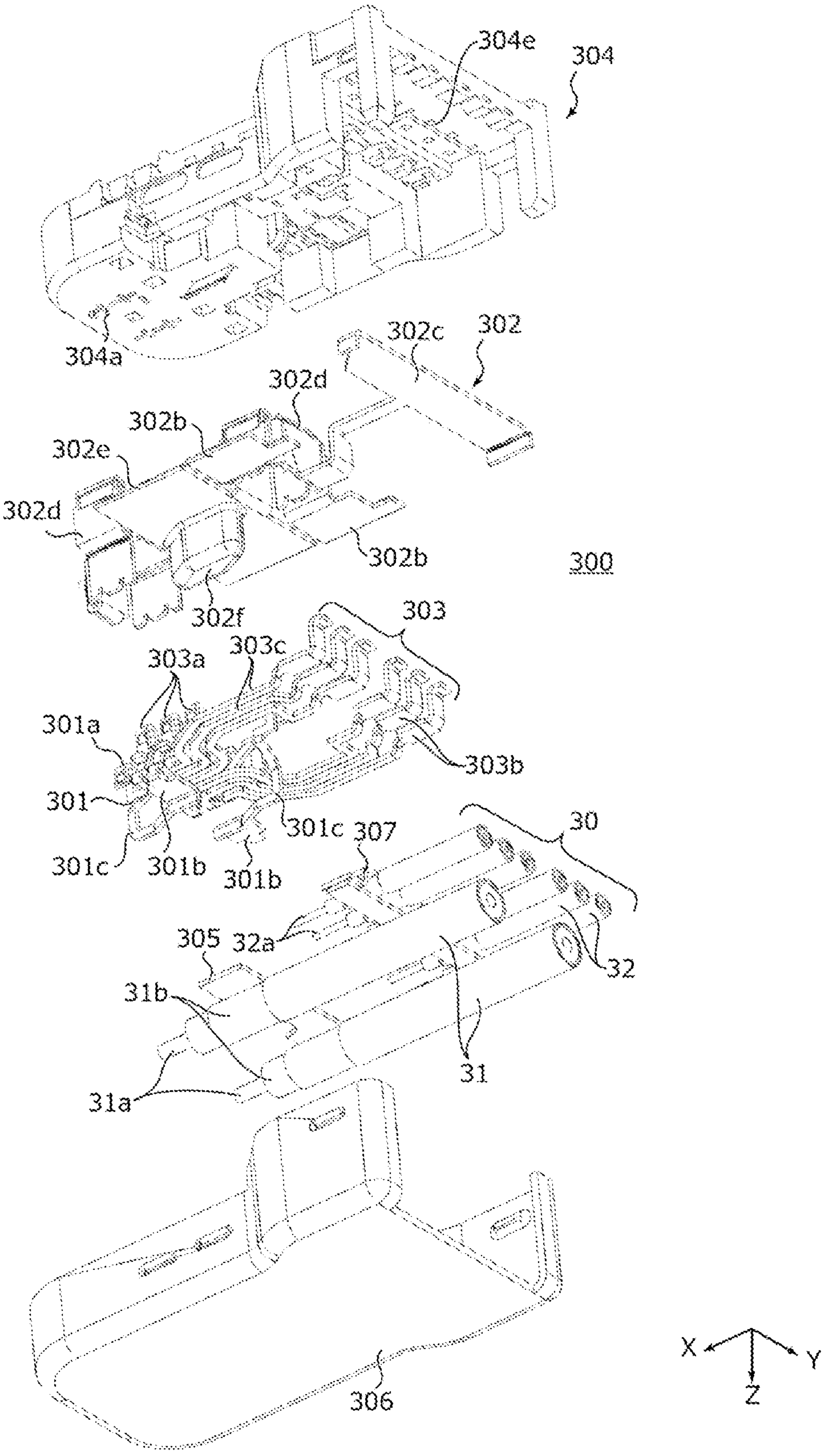
FIG. 16 is an exploded perspective view illustrating the plug connector according to the third embodiment.

FIGS. 15 and 16 are exploded perspective views illustrating plug connector 300. FIG. 15 is an exploded perspective view as viewed from the fitting side, and FIG. 16 is an exploded perspective view as viewed from the + side in the Z direction on the opposite side.

Figure 17A:
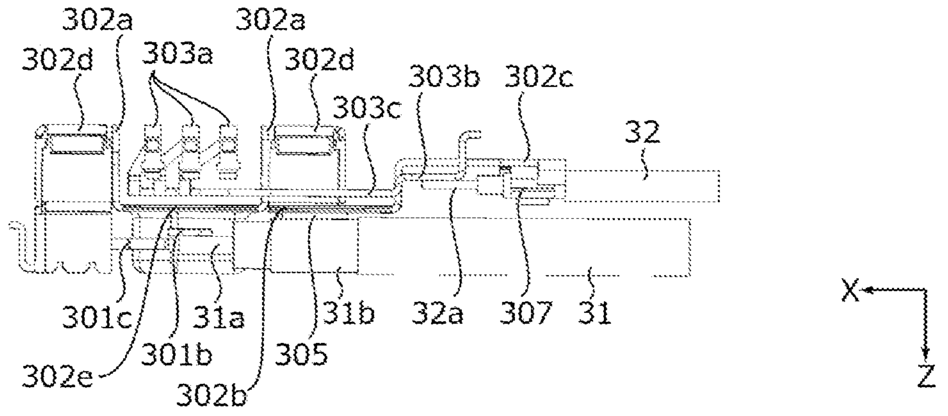
FIGS. 17A and 17B are diagrams illustrating wiring inside the plug connector according to the third embodiment.
Figure 17B:
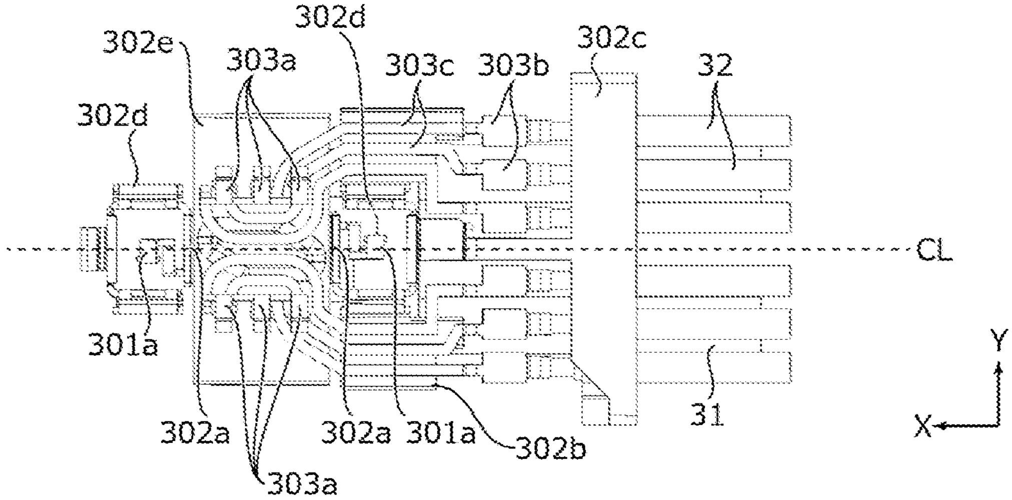

FIGS. 17A and 17B are diagrams illustrating wiring inside plug connector 300, and the illustration of plug insulator 304 and plug cover 306 is omitted. FIG. 17A is a side view as viewed from the – side in the Y direction, and FIG. 17B is a plan view as viewed from the fitting side.

As illustrated in FIGS. 14 to 16, plug connector 300 includes first plug contact 301, second plug contact 302, third plug contact 303, plug insulator 304 and plug cover 306. First plug contact 301, second plug contact 302 and third plug contact 303 are formed of a conductive material such as metal (e.g., a copper alloy). Plug insulator 304 is formed of an insulating material such as a synthetic resin (e.g., liquid crystal polymer).

In FIG. 14, region F3 surrounded by the broken line is the fitting region of plug connector 300 as viewed from the fitting direction, i.e., the region where it is fit to receptacle connector 320 (hereinafter referred to as "fitting region F3"). In the embodiment, first connection part 301*b* of first plug contact 301 and first shield connection part 302*b* of second plug contact 302 are disposed to overlap fitting region F3 in the fitting direction. On the other hand, third connection part 303*b* of third plug contact 303 is disposed outside fitting region F3 in the pitch direction.

Two first plug contacts 301 are provided corresponding to two coaxial cables 31. Two first plug contacts 301 have different shapes, and are spatially separated from each other so as not to interfere with each other. Each first plug contact 301 includes first contact point part 301*a*, first connection part 301*b*, and first relaying part 301*c* that connects first contact point part 301*a* and first connection part 301*b*.

When plug connector 300 and receptacle connector 320 are fit to each other, first contact point part 301*a* is brought into contact with and electrically connected to first contact point part 321*a* of receptacle connector 320. More specifically, first contact point part 301*a* is folded-back in a U-shape toward the outside along the Y direction, and is provided with an engaging protrusion (whose reference numeral is omitted) that engages with an engaging recess (whose reference numeral is omitted) of first receptacle contact 321 at the outer surface of the end portion. Two first contact point parts 301*a* are disposed on both sides of third contact point part 303*a* in the X direction.

First connection part 301*b* is formed in a flat plate shape, and inner conductor 31*a* of first coaxial cable 31 exposed at the step-stripped tip end portion is connected to it from the + side in the Z direction by soldering, for example. Two first connection parts 301*b* are disposed side by side in the Y direction orthogonal to the Z direction as the fitting direction and the X direction as the pitch direction.

One first relaying part 301*c* substantially perpendicularly extends toward the + side in the Z direction from first contact point part 301*a* located on the + side in the X direction, and then extends toward the − side in the X direction. The other first relaying part 301*c* substantially perpendicularly extends toward the + side in the Z direction from first contact point part 301*a* located on the − side in the X direction, and then extends toward the + side in the X direction.

Second plug contact 302 is a member connected to outer shield layer 31*b* of first coaxial cable 31 and outer shield layer 32*b* of second coaxial cable 32, and is electrically grounded to antenna module board PCB through receptacle shell 325 of receptacle connector 320. Second plug contact 302 is formed by processing a single metal sheet, for example. Note that second plug contact 302 may be composed of a plurality of members as long as the members are electrically connected to each other.

Second plug contact 302 includes contact-to-contact shielding part 302*a*, first shield connection part 302*b*, second shield connection part 302*c*, contact point periphery shielding part 302*d*, contact point-connection blocking part 302*e* and connection blocking part 302*f*.

Two contact-to-contact shielding parts 302*a* are provided corresponding to first contact point part 301*a* of two first plug contacts 301. Each contact-to-contact shielding part 302*a* is disposed between first contact point part 301*a* of first plug contact 301 and third contact point part 303*a* of third plug contact 303. More specifically, contact-to-contact shielding part 302*a* has a flat plate shape extending in the YZ plane and is upright in the Z direction from contact point-connection blocking part 302*e* extending in the XY plane.

First shield connection part 302*b* is formed in a flat plate shape extending in the XY plane, and is electrically connected to outer shield layer 31*b* of first coaxial cable 31 through first ground bar 305 (see FIGS. 17A and 17B). Two first shield connection parts 302*b* are disposed side by side in the Y direction orthogonal to the Z direction as the fitting direction and the X direction as the pitch direction. Outer shield layer 21*b* of first coaxial cable 21 exposed at the step-stripped tip end portion is connected to first ground bar 305 from the + side in the Z direction by soldering, for example. First ground bar 305 is connected to first shield connection part 302*b* from the + side in the Z direction by soldering, for example.

Second shield connection part 302*c* is formed in a flat plate shape extending in the Y direction, and is electrically connected to outer shield layer 32*b* of second coaxial cable 32 through second ground bar 307 (see FIGS. 17A and 17B). Second ground bar 307 sandwiches outer shield layer 32*b* of second coaxial cable 32, and is connected by soldering, for example. Second ground bar 307 is connected to second shield connection part 302*c* from the + side in the Z direction by soldering, for example.

Contact point periphery shielding part 302*d* is disposed on the three sides of first contact point part 301*a*, and has a rectangular cylindrical shape together with contact-to-contact shielding part 302*a*. More specifically, contact point periphery shielding part 302*d* is continuously provided in a bent manner in the X direction from one side, in the Y direction, of contact-to-contact shielding part 302*a* extending in the YZ plane, and contact point periphery shielding part 302*d* is then bent in a substantially U-shape such that the end portion is close to the other side of contact-to-contact shielding part 302*a*. That is, contact point periphery shielding part 302*d* includes two walls extending in the XZ plane, and one wall extending in the YZ plane.

Contact-to-contact shielding part 302*a* is located at the open portion of the U-shape of contact point periphery shielding part 302*d*. In addition, in one contact point periphery shielding part 302*d* located on the side closer to second shield connection part 302*c*, first shield connection part 302*b* is continuously provided at the end portion on the + side in the Z direction of the two walls facing each other in the Y direction.

Note that contact point periphery shielding part 302*d* may be continuously provided in a bent manner in the X direction from both sides in the Y direction of contact-to-contact shielding part 302*a* extending in the YZ plane, and the two walls may be bent in a substantially L-shape such that their end portions are opposite and close to contact-to-contact shielding part 302*a* in the X direction. That is, contact point periphery shielding part 302*d* may be formed in a symmetrical manner with respect to the central axis along the X direction of third contact point part 303*a* arranged in two lines. Also in this case, contact point periphery shielding part 302*d* has a U-shape as a whole, and contact-to-contact shielding part 302*a* is located at the open portion of the U-shape.

Contact point-connection blocking part 302*e* is formed in a flat plate shape extending in the XY plane, and disposed between first connection part 301*b* and third contact point part 303*a* in the Z direction. Contact-to-contact shielding part 302*a* is continuously provided at both end portions of contact point-connection blocking part 302*e* in the X direction. In other words, two contact-to-contact shielding parts 302*a* are coupled by contact point-connection blocking part 302*e*.

Connection blocking part 302*f* is protruded to the + side in the Z direction at contact point-connection blocking part 302*e*, and disposed between two first connection parts 301*b*.

Contact-to-contact shielding part 302*a*, contact point periphery shielding part 302*d*, contact point-connection blocking part 302*e* and connection blocking part 302*f* shield the part between two first plug contacts 301 and the part between first plug contact 301 and third plug contact 303, thus improving the signal transmission characteristics. In addition, since they are formed of a single plate member and coupled with each other, the same potential is reliably obtained, and the ground can be reinforced.

Third plug contact 303 includes third contact point part 303*a*, third connection part 303*b*, and third relaying part 303*c* that connects third contact point part 303*a* and third connection part 303*b*.

Third contact point part 303*a* is brought into contact with and electrically connected to third contact point part 323*a* of receptacle connector 320 when plug connector 300 and receptacle connector 320 are fit to each other. More specifically, third contact point part 303*a* is folded-back in a U-shape toward the outside, and is provided with an engaging protrusion (whose reference numeral is omitted) that engages with an engaging recess (whose reference numeral is omitted) of third receptacle contact 323 at the outer surface of the end portion.

Third connection part 303*b* is formed in a flat plate shape, and inner conductor 32*a* of second coaxial cable 32 exposed at the step-stripped tip end portion is connected to it from the + side in the Z direction by soldering, for example. Six third connection parts 303*b* are disposed side by side in the Y direction orthogonal to the Z direction as the fitting direction and the X direction as the pitch direction. Note that third connection part 303*b* may be shifted from one another in a staggered manner in the X direction as long as they are disposed side by side in the Y direction as a whole, for example. Third relaying part 303*c* substantially perpendicularly extends toward the + side in the Z direction from third contact point part 303*a*, and is bent in the Y direction and extended inward, and then, extended in the X direction.

Plug connector 300 includes three pairs of third plug contacts 303 with symmetric shapes. Each of three pairs of third plug contacts 303 is disposed in a line-symmetric manner with respect to center line CL extending along the X direction.

Plug insulator 304 forms the housing of plug connector 300 together with plug cover 306. Plug insulator 304 includes base part 304*a*, first fitting protrusion 304*c*, second fitting protrusion 304*d* and contact attaching portion 304*e*.

Base part 304*a* extends in the XY plane, and has a rectangular shape in plan view as viewed from the Z direction. First fitting protrusion 304*c* and second fitting protrusion 304*d* are portions fit to receptacle connector 320, and are provided to protrude to the fitting side from base part 304*a*. First fitting protrusion 304*c* is disposed on both sides of second fitting protrusion 304*d* in the X direction. Contact attaching portion 304*e* is disposed outside fitting region F3 in the pitch direction. Third connection part 303*b* of third plug contact 303 is disposed at contact attaching portion 304*e*.

First plug contact 301, second plug contact 302 and third plug contact 303 are assembled to plug insulator 304. First plug contact 301, second plug contact 302 and third plug contact 303 are formed integrally with plug insulator 304 by insert molding, for example. First plug contact 301, second plug contact 302 and third plug contact 303 are separated from each other and are electrically isolated from each other by plug insulator 304.

First contact point part 301*a* of first plug contact 301 is disposed at the inner wall (whose reference numeral is omitted) of first fitting protrusion 304*c* of plug insulator 304, with the surface exposed. First connection part 301*b* of first plug contact 301 is exposed from the inner surface side of base part 304*a* of plug insulator 304.

Contact-to-contact shielding part 302*a* and contact point periphery shielding part 302*d* of second plug contact 302 are disposed at the outer wall (whose reference numeral is omitted) of first fitting protrusion 304*c* of plug insulator 304, with the surface exposed. First shield connection part 302*b* of second plug contact 302 is exposed from the inner surface side of base part 304*a* of plug insulator 304, and second shield connection part 302*c* is exposed from the inner surface side of contact attaching portion 304*e*.

Third contact point part 303*a* of third plug contact 303 is disposed at second fitting protrusion 304*d* of plug insulator 304, with the surface exposed. Third connection part 303*b* of third plug contact 303 is exposed from the inner surface side of contact attaching portion 304*e* of plug insulator 304.

Plug cover 306 is a protector that forms the housing of plug connector 300 together with plug insulator 304, and is disposed to cover the side surface of plug insulator 304. Plug insulator 304 is housed inside plug cover 306.

Connection object cable 30 is sandwiched by plug cover 306 and contact attaching portion 304*e* of plug insulator 304. That is, plug cover 306 and plug insulator 304 serve as a cable holding part, and holds the end portion of connection object cable 30.

Note that the connecting portion of connection object cable 30 may be reinforced by forming a molding by injecting and curing mold resin inside the connector after connecting connection object cable 30 to plug connector 300.

First coaxial cable 31 and second coaxial cable 32 are held by plug insulator 304 and plug cover 306 in the state where they are disposed in two stages differing in the fitting direction. That is, first connection part 301*b* of first plug contact 301, shield connection parts 302*b* and 302*c* of second plug contact 302, and third connection part 303*b* of third plug contact 303 are disposed in two stages differing in the fitting direction. In this manner, in comparison with the case where connection object cable 30 is arranged in one stage (see, e.g., the second embodiment), the arrangement width of connection object cable 30 is smaller, and thus the width of plug connector 300 can be easily set to a width equal to or smaller than antenna module board PCB.

In the third embodiment, the pin assign in plug connector 300 is as follows.

Specifically, first contact point part 301*a* of first plug contact 301 and contact-to-contact shielding part 302*a* of second plug contact 302 are disposed on both sides in the pitch direction of third contact point parts 303*a* of a plurality of third plug contacts 303, and contact-to-contact shielding part 302*a* is disposed between first contact point part 301*a* and third contact point part 303*a*. First contact point part 301*a* is surrounded and shielded from the four sides by second plug contact 302 having the ground potential.

Figure 18A:
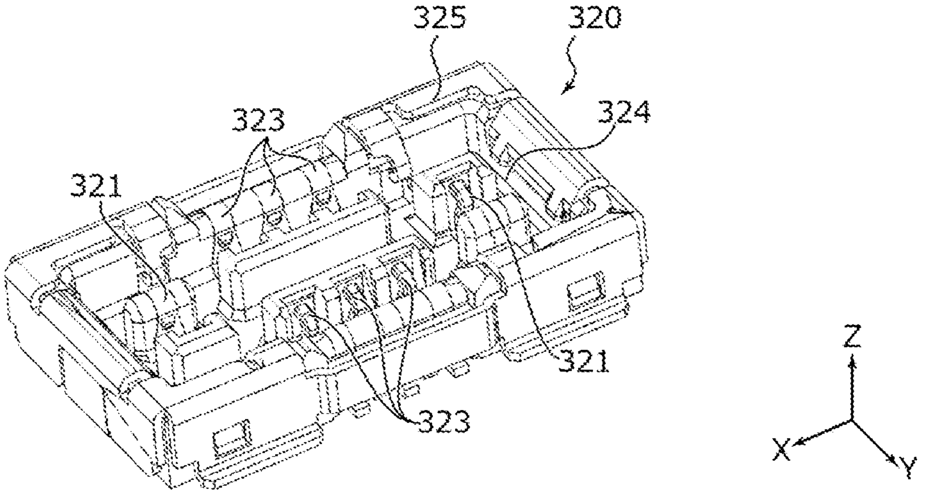
FIGS. 18A and 18B are views illustrating an external appearance of a receptacle connector according to the third embodiment.
Figure 18B:
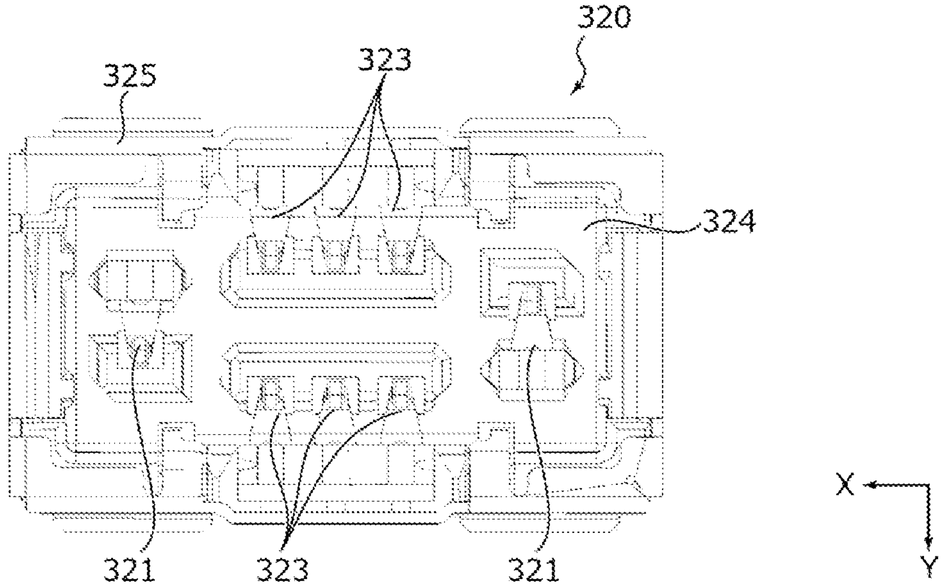

FIGS. 18A and 18B are perspective views illustrating an external appearance of receptacle connector 320. FIG. 18A is a perspective view illustrating an external appearance of receptacle connector 320 as viewed from the + side in the Z direction (hereinafter referred to as "fitting side") on which it is fit to plug connector 300. FIG. 18B is a plan view illustrating receptacle connector 320 as viewed from the fitting side.

Figure 19:
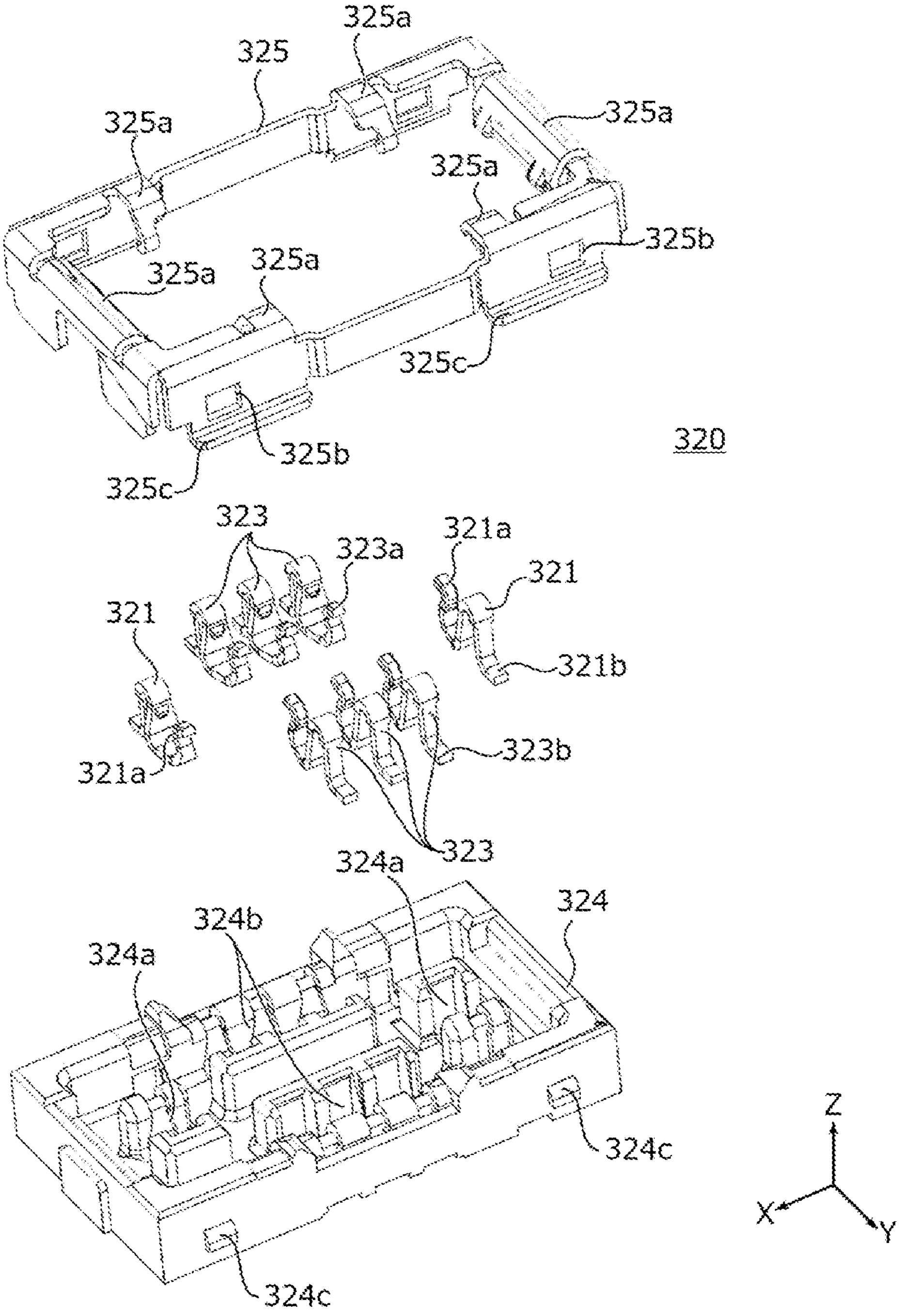
FIG. 19 is an exploded perspective view illustrating the receptacle connector according to the third embodiment.

FIG. 19 is an exploded perspective view illustrating receptacle connector 320 as viewed from the fitting side.

As illustrated in FIGS. 18A, 18B and 19, receptacle connector 320 includes first receptacle contact 321, third receptacle contact 323, receptacle insulator 324 and receptacle shell 325. First receptacle contact 321, third receptacle contact 323 and receptacle shell 325 are formed of a conductive material such as metal (e.g., a copper alloy). Receptacle insulator 324 is formed of an insulating material such as a synthetic resin (e.g., liquid crystal polymer).

First receptacle contact 321 and third receptacle contact 323 have the same shape, and are disposed side by side at first fitting recess 324*a* and second fitting recess 324*b* of receptacle insulator 324. The pin assign in receptacle connector 320 corresponds to the pin assign of plug connector 300. Note that first receptacle contact 321 and third receptacle contact 323 may not have the same shape, while the same shape allows for the use of common contact components.

First receptacle contact 321 includes first contact point part 321*a* and first connection part 321*b*. Third receptacle contact 323 includes third contact point part 323*a* and third connection part 323*b*.

First contact point part 321*a* and third contact point part 323*a* are brought into contact with and electrically connected to first contact point part 301*a* and third contact point part 303*a* of plug connector 300 when plug connector 300 and receptacle connector 320 are fit to each other. More specifically, first contact point part 321*a* and third contact point part 323*a* are each curved in a U-shape, and provided with a spring piece (whose reference numeral is omitted) for applying a biasing force to the opposite surface at the tip end portion as the free end. In addition, engaging recesses (whose reference numeral is omitted) that engage with engaging protrusions (whose reference numeral is omitted) of first plug contact 301 and third plug contact 303 are provided at the surfaces facing the spring pieces.

First connection part 321*b* and third connection part 323*b* are each drawn to the side opposite to the fitting side, and connected to the conductor pattern of antenna module board PCB by soldering, for example.

Receptacle shell 325 is a frame connected to the ground of antenna module board PCB, and has a rectangular shape corresponding to the outer edge of receptacle insulator 324 in plan view as viewed from the Z direction. Receptacle shell 325 includes engagement piece 325*a*, engagement hole 325*b* and ground connection part 325*c*. Receptacle shell 325 is formed by processing a single metal sheet, for example.

A plurality of engagement pieces 325*a* is disposed and bent inward in a U-shape at the upper part of receptacle shell 325. A plurality of engagement holes 325*b* is disposed at the side surface of receptacle shell 325. Engagement piece 325*a* is engaged with the outer wall of receptacle insulator 324, and engagement hole 325*b* is engaged with engaging protrusion 324*c* of receptacle insulator 324, and thus, receptacle shell 325 is fit and fixed to receptacle insulator 324.

In addition, engagement piece 325*a* has a spring elasticity, and is brought into elastic contact with and electrically connected to contact point periphery shielding part 302*d* of second plug contact 302 when plug connector 300 and receptacle connector 320 are fit to each other. A plurality of ground connection parts 325*c* is provided at the lower portion of receptacle shell 325, and grounded to antenna module board PCB by soldering, for example.

Receptacle insulator 324 has a rectangular shape in plan view as viewed from the Z direction, and forms a housing of receptacle connector 320. Receptacle insulator 324 includes first fitting recess 324*a* and second fitting recess 324*b*, and can be fit to plug insulator 304. First fitting recess 324*a* is disposed on both sides of second fitting recess 324*b* in the X direction, and first fitting protrusion 304*c* of plug insulator 304 is fit to it. Second fitting protrusion 304*d* of plug insulator 304 is fit to second fitting recess 324*b*.

First receptacle contact 321, third receptacle contact 323 and receptacle shell 325 are assembled to receptacle insulator 324. First receptacle contact 321 and third receptacle contact 323 are formed integrally with receptacle insulator 324 by insert molding, for example. Receptacle shell 325 is fit to the peripheral portion of receptacle insulator 324.

As described above, in the connector set according to the third embodiment 3, plug connector 300 is an electric wire-to-board connector that connects antenna module board PCB and connection object cable 30 including inner conductor 31*a* of first coaxial cable 31 used for transmission of radio frequency signals (first conductive path), outer shield layers 31*b* and 32*b* of first coaxial cable 31 and second coaxial cable 32 used for the shield (second conductive path) and inner conductor 32*a* of six second coaxial cables 32 (third conductive path) when fit to receptacle connector 320 (mating connector) mounted in antenna module board PCB (circuit board).

Plug connector 300 includes first plug contact 301 (first contact) including first contact point part 301*a* connected to first receptacle contact 321 (first mating contact) and first connection part 301*b* connected to inner conductor 31*a* of first coaxial cable 31, second plug contact 302 (second contact) including shield connection part 302*b* (second connection part) connected to outer shield layers 31*b* and 32*b* of first coaxial cable 31 and second coaxial cable 32, a plurality of third plug contacts 303 (third contact) including third contact point part 303*a* connected to third receptacle contact 323 (third mating contact) and third connection part 303*b* connected to inner conductor 32*a* of second coaxial cable 32, plug insulator 304 (insulator) to which first plug contact 301, second plug contact 302 and third plug contact 303 are assembled, and the cable holding part that holds connection object cable 30 so as to be drawn out in the pitch direction as the arrangement direction of third contact point part 303*a*. In the third embodiment, connection object cable 30 is held by plug insulator 304 and plug cover 306.

More specifically, plug connector 300 includes a plurality of first plug contacts 301 and a plurality of third plug contacts 303, and a plurality of first connection parts 301*b* and a plurality of third connection parts 303*b* are each disposed side by side in the Y direction orthogonal to the fitting direction and the pitch direction.

In plug connector 300, connection object cable 30 is drawn out from plug connector 300 such that the pitch direction of plug connector 300 and the extending direction of connection object cable 30 coincide with each other. In this manner, when plug connector 300 and receptacle connector 320 are fit to each other, the extending direction of connection object cable 30 can coincide with the extending direction of antenna module board PCB. Thus, the space-saving of the in-equipment wiring can be achieved, and the size reduction of communication devices can be supported.

In addition, in plug connector 300, second plug contact 302 (second contact) includes contact-to-contact shielding part 302*a* disposed between first contact point part 301*a* and third contact point part 303*a*, first contact point part 301*a* and contact-to-contact shielding part 302*a* are disposed on both sides of the plurality of third contact point parts 303*a* in the pitch direction, and contact-to-contact shielding part 302*a* is disposed between first contact point part 301*a* and third contact point part 303*a*. In this manner, with contact-to-contact shielding part 302*a* having the ground potential disposed between first contact point part 301*a* and third contact point part 303*a*, the part between first plug contact 301 and third plug contact 303 is shielded, thus improving the signal transmission characteristics.

In addition, in plug connector 300, second plug contact 302 includes contact point periphery shielding part 302*d* (radio frequency signal contact point shielding part) disposed to surround first contact point part 301*a* together with contact-to-contact shielding part 302*a*. In this manner, the periphery part of first contact point part 301*a* is reliably shielded, thus further improving the signal transmission characteristics.

In addition, in plug connector 300, first plug contact 301 includes first relaying part 301*c* that couples first contact point part 301*a* and first connection part 301*b*, and third plug contact 303 includes third relaying part 303*c* that couples third contact point part 303*a* and third connection part 303*b*. In plan view as viewed from the fitting direction, first relaying part 301*c* and third relaying part 303*c* have respective shapes extended in the Y direction orthogonal to the fitting direction and the pitch direction from first contact point part 301*a* and third contact point part 303*a*, and bent and extended in the X direction (the pitch direction) to first connection part 301*b* and third connection part 303*b*. In this manner, first connection part 301*b* and the plurality of third connection parts 303*b* can be easily disposed side by side in the Y direction, and first coaxial cable 31 and second coaxial cable 32 as connection object cable 30 can be connected to plug connector 300 so as to extend in the pitch direction.

In addition, in plug connector 300, first connection part 301*b*, shield connection parts 302*b* and 302*c* and third connection part 303*b* are disposed in two stages differing in the fitting direction. In this manner, in comparison with the case where connection object cable 30 is disposed in one stage, the arrangement width of connection object cable 30 can be reduced, and thus the width of plug connector 300 can be easily set to a width equal to or smaller than antenna module board PCB.

The invention made by the present inventor has been described specifically based on the above embodiments. The invention is not limited to the above embodiments, but can be modified to the extent not to depart from the gist thereof.

Figure 20:
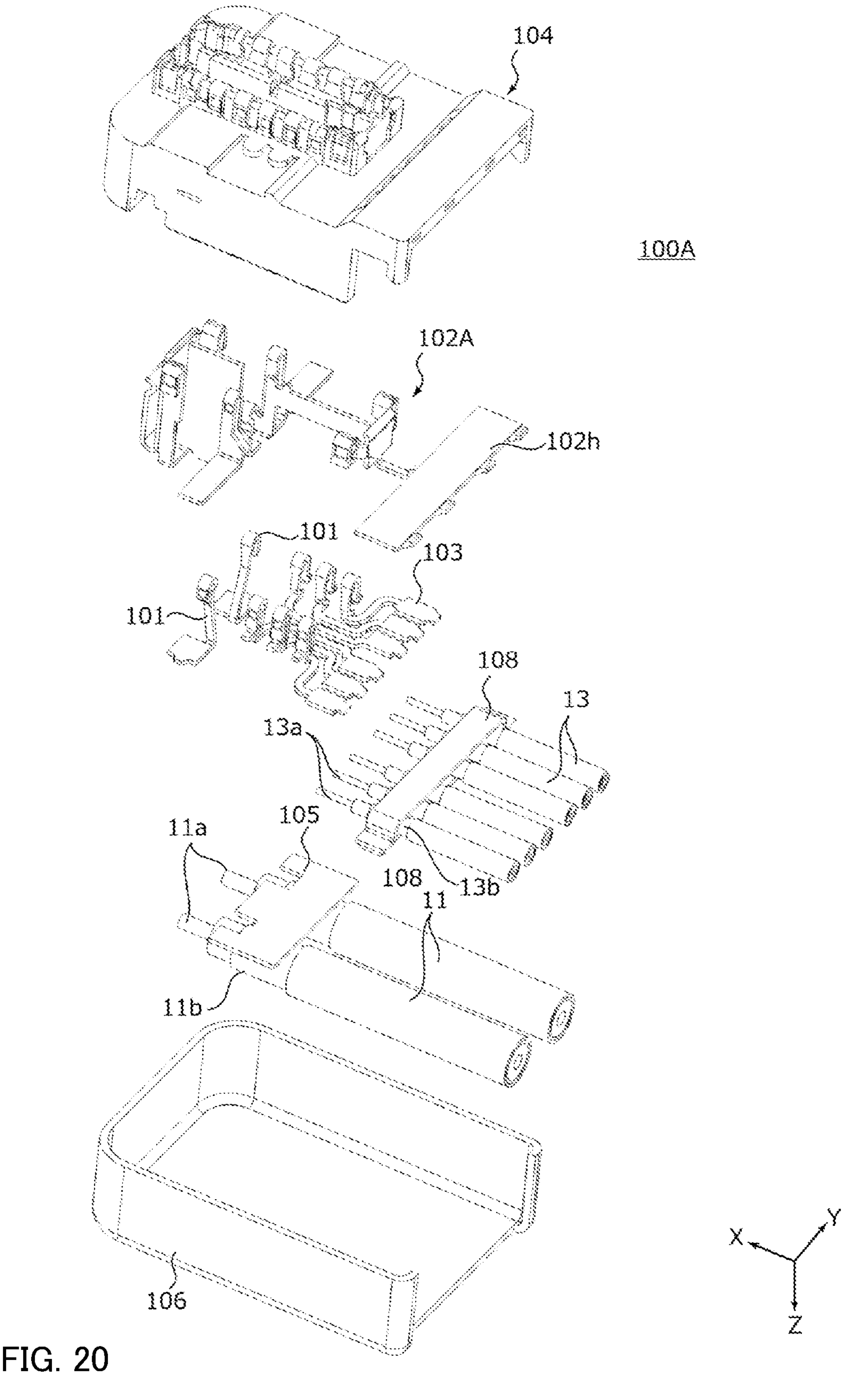
FIG. 20 is an exploded perspective view illustrating a plug connector according to Variation 1.

For example, in the first embodiment, a coaxial cable may be applied instead of discrete cable 12. In this case, as with plug connector 100A illustrated in FIG. 20, outer shield layer 13*b* of coaxial cable 13 is electrically coupled to shield connecting part 102*h* of second plug contact 102A through ground bar 108. Likewise, in the second embodiment and the third embodiment, a discrete cable may be applied instead of second coaxial cables 22 and 32.

Figure 21A:
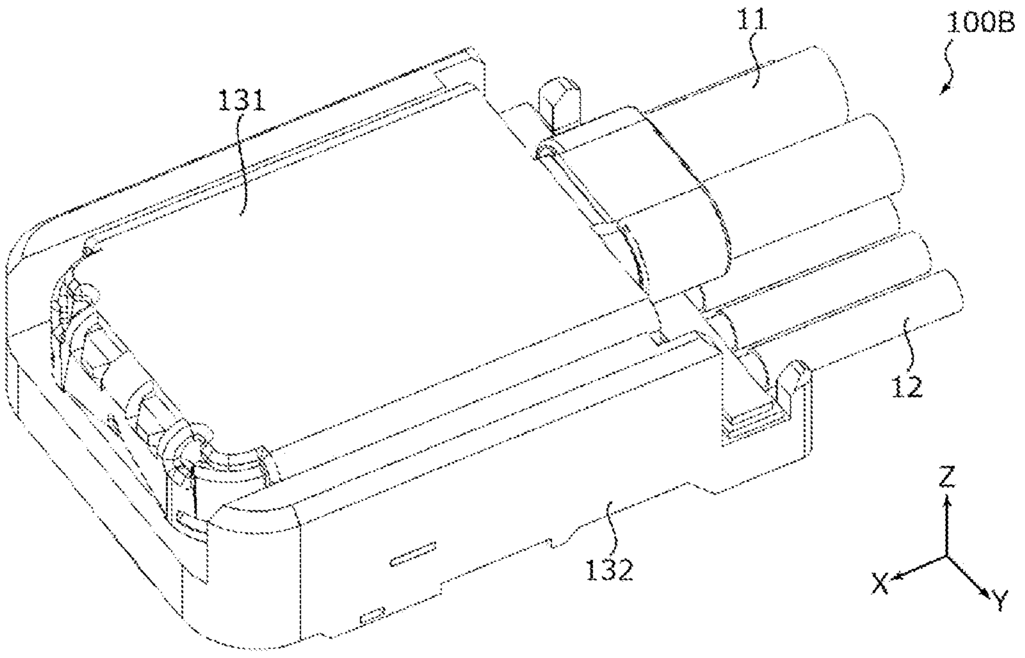
FIGS. 21A and 21B are perspective views illustrating an external appearance of a plug connector according to Variation 2.
Figure 21B:
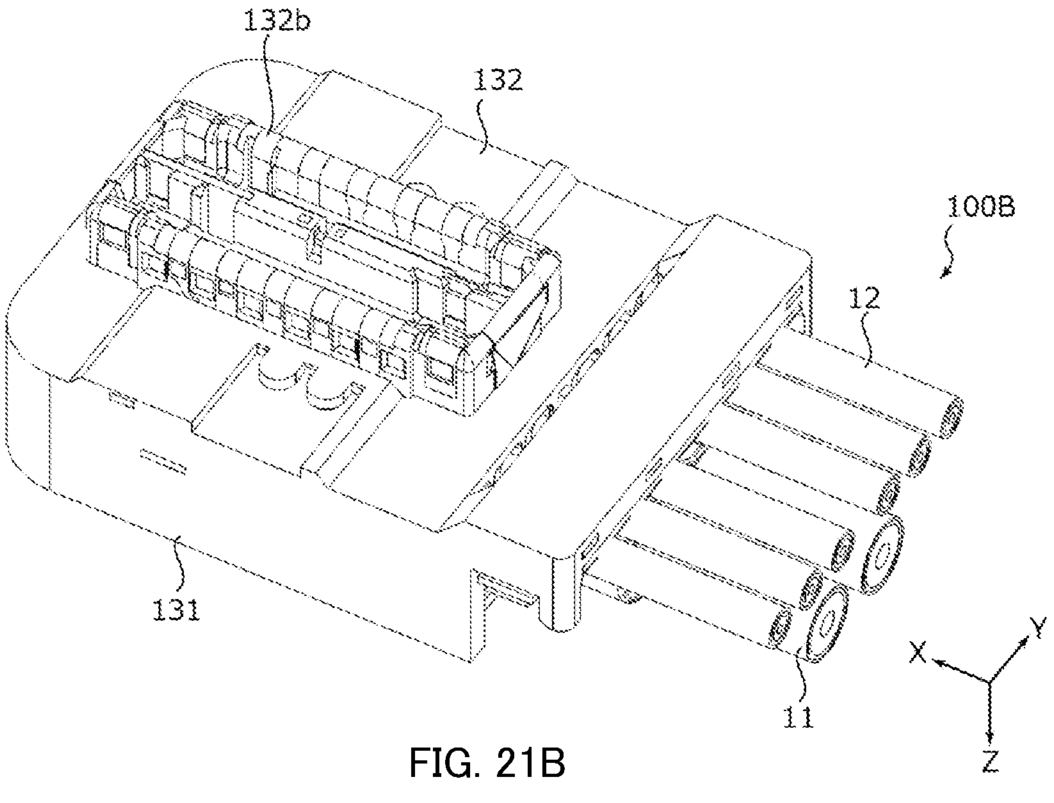
Figure 22A:
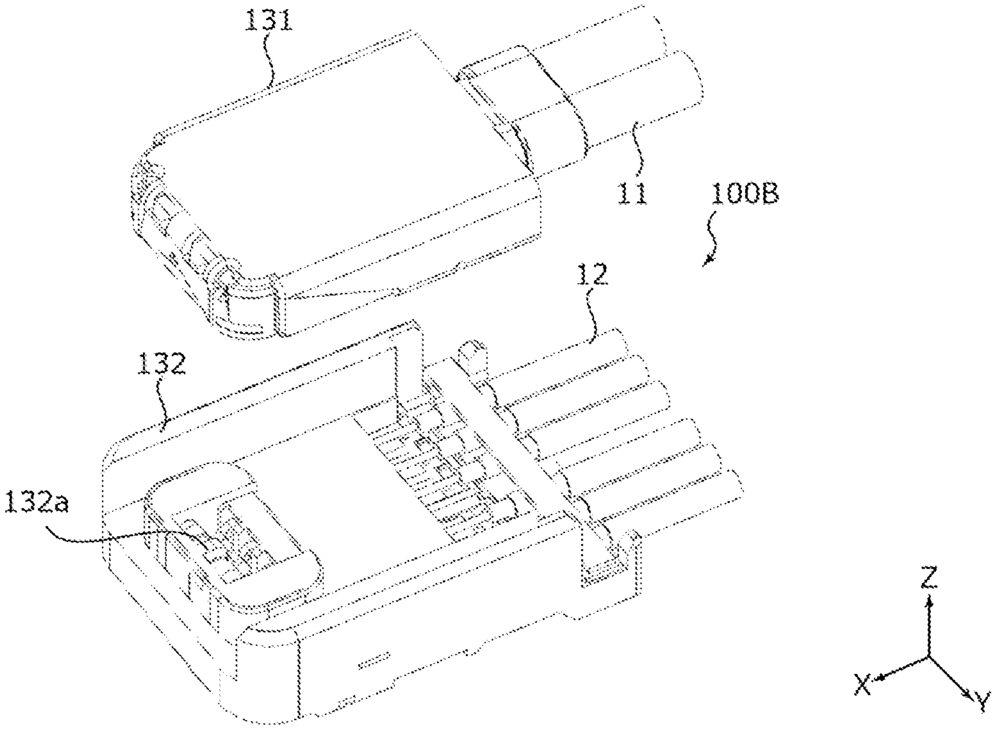
FIGS. 22A and 22B are exploded perspective views illustrating the plug connector according to Variation 2.
Figure 22B:
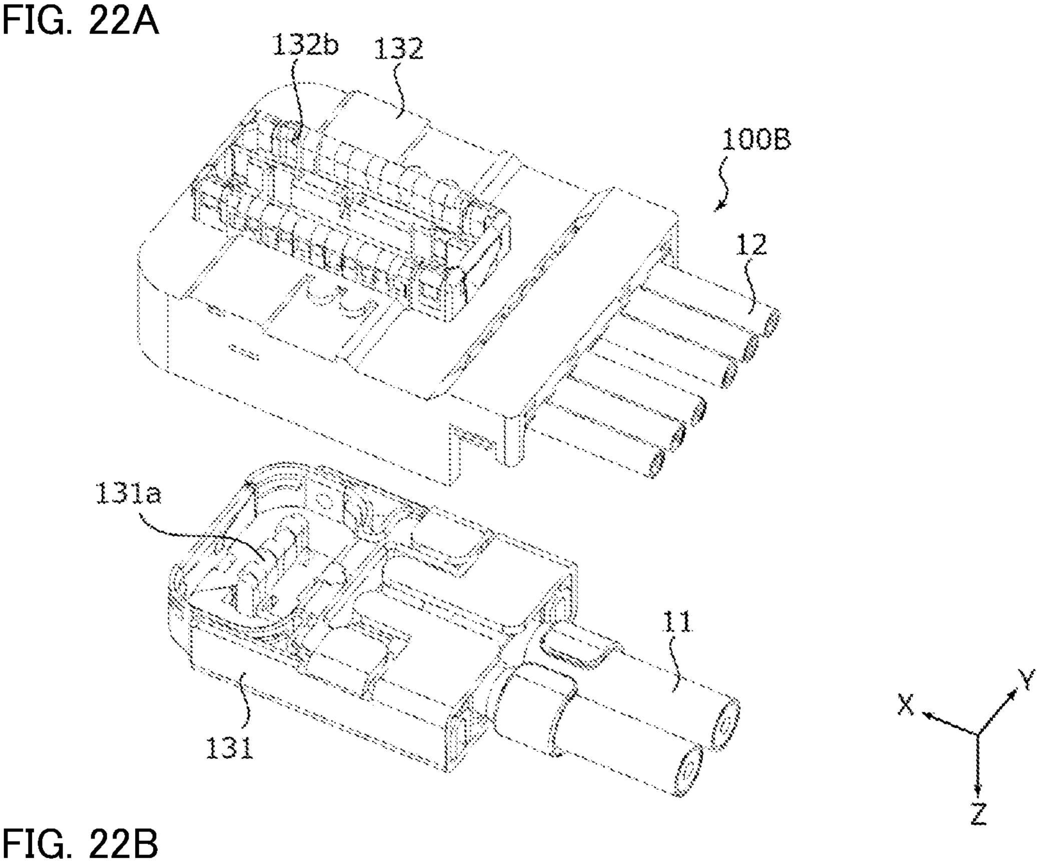

In addition, as with plug connector 100B illustrated in FIGS. 21A and 21B, a two-unit structure composed of coaxial cable unit 131 and plug main body unit 132 may be employed. In this case, as illustrated in FIGS. 22A and 22B, coaxial cable unit 131 includes first relaying fit part 131*a*, and plug main body unit 132 includes second relaying fit part 132*a*. When first relaying fit part 131*a* and second relaying fit part 132*a* are fit to each other, their first plug contact and second plug contact are brought into contact with and electrically connected to each other.

In addition, plug main body unit 132 includes body fitting part 132*b* connected to a receptacle connector (not illustrated). For the contact structure (pin lay out) of body fitting part 132*b*, the structures described in the first to third embodiments may be applied, for example. In plug main body unit 132, the first plug contact and the second plug contact are disposed over second relaying fit part 132*a* to body fitting part 132*b*.

As described above, plug connector 100B includes coaxial cable unit 131 (first unit) to which coaxial cable 11 (first conductive path) is connected, and plug main body unit 132 (second unit) to which a plurality of discrete cables 12 (third conductive path) is connected, and coaxial cable unit 131 and plug main body unit 132 are electrically and physically fit to each other. Body fitting part 132*b* including the first contact point part, the second contact point part and the third contact point part is disposed at plug main body unit 132 (one of the first unit and the second unit). In this manner, the ease of the assembly operation of plug connector 100B increases. In addition, a connector mounted in flat cables such as flexible flat cables (FFC) and flexible printed circuit boards (FPC) can be fit to second relaying fit part 132*a* of plug main body unit 132, and thus the versatility is improved.

In addition, the specific structures of the plug connector and the receptacle connector are not limited to those described in the embodiments, and may be appropriately changed. In addition, the number of cables making up the connection object cable may be appropriately changed.

The embodiments disclosed herein should be considered in all respects exemplary and not restrictive. The scope of the invention is indicated by the claims, not by the above description, and is intended to include all modifications within the meaning and scope equivalent to the claims.

This application is entitled to and claims the benefit of Japanese Patent Application No. 2021-137428 filed on Aug. 25, 2021, the disclosure each of which including the specification, drawings and abstract is incorporated herein by reference in its entirety.

REFERENCE SIGNS LIST

1 Connector set
10 Connection object cable
11 Coaxial cable
11*a* Inner conductor (First conductive path)
11*b* Outer shield layer (Second conductive path)
12 Discrete cable
12*a* Inner conductor (Third conductive path)
100 Plug connector (Connector)
101 First plug contact (First contact)
101*a* First contact point part
101*b* First connection part
101*c* First relaying part
102 Second plug contact (Second contact)
102*a* Contact-to-contact shielding part (Second contact point part)
102*b* Shield connection part (Second connection part)
103 Third plug contact (Third contact)
103*a* Third contact point part
103*b* Third connection part
103*c* Third relaying part
104 Plug insulator (insulator)
106 Plug cover
107 Molding
120 Receptacle connector (Mating connector)

The invention claimed is:

1. A connector configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector comprising:

a plurality of first contacts including a first contact point part connected to a first mating contact of the mating connector and a first connection part connected to the first conductive path;

a second contact including a second connection part connected to the second conductive path;

a plurality of third contacts including a third contact point part connected to a third mating contact of the mating connector and a third connection part connected to the third conductive path; and an insulator to which the first contact, the second contact and the third contact are assembled, wherein the second contact includes a contact-to-contact shielding part disposed between the first contact point part and the third contact point part, wherein the first contact point part and the contact-to-contact shielding part are disposed on both sides of a plurality of the third contact point parts in a pitch direction, and wherein the contact-to-contact shielding part is disposed between the first contact point part and the third contact point part.

2. The connector according to claim 1, wherein the second contact includes a radio frequency signal contact point shielding part disposed to surround the first contact point part together with the contact-to-contact shielding part.

3. The connector according to claim 1, wherein the connection object cable is configured to be drawn in the pitch direction, the pitch direction being an arrangement direction of the third contact point part.

4. The connector according to claim 3, wherein a plurality of the first connection parts and a plurality of the third connection parts are disposed side by side in a direction orthogonal to a fitting direction and the pitch direction.

5. The connector according to claim 4, wherein the first contact includes a first relaying part configured to couple the first contact point part and the first connection part, wherein the third contact includes a third relaying part configured to couple the third contact point part and the third connection part, and wherein in plan view as viewed from the fitting direction, the first relaying part has a shape that is extended in a direction orthogonal to the fitting direction and the pitch direction from the first contact point part, and bent and extended in the pitch direction to the first connection part, and the third relaying part has a shape that is extended in the direction orthogonal to the fitting direction and the pitch direction from the third contact point part, and bent and extended in the pitch direction to the third connection part.

6. The connector according to claim 1, wherein the first connection part, the second connection part and the third connection part are connectable to a coaxial cable including the first conductive path and the second conductive path and another cable different from the coaxial cable, and are connectable to a flat cable including the first conductive path, the second conductive path and the third conductive path.

7. The connector according to claim 1, wherein the first connection part, the second connection part and the third connection part are disposed in two stages differing in the fitting direction.

8. The connector according to claim 1, further comprising:

a first unit to which the first conductive path is connected; and a second unit to which a plurality of the third conductive paths is connected, wherein the first unit and the second unit are electrically and physically fit to each other, and wherein the first contact point part, the second contact point part and the third contact point part are disposed in one of the first unit and the second unit.

9. A connector configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector comprising:

a first contact including a first contact point part connected to a first mating contact of the mating connector and a first connection part connected to the first conductive path;

a second contact including a second connection part connected to the second conductive path;

a third contact including a third contact point part connected to a third mating contact of the mating connector and a third connection part connected to the third conductive path;

an insulator to which the first contact, the second contact and the third contact are assembled; and a cable holding part configured to hold the connection object cable so as to be drawn out in a pitch direction, the pitch direction being a direction of in which the first contact point part and the third contact point part are arranged.

10. The connector according to claim 9, further comprising a plurality of the first contacts and a plurality of the third contacts, wherein a plurality of the first connection parts and a plurality of the third connection parts are disposed side by side in a direction orthogonal to a fitting direction and the pitch direction.

11. The connector according to claim 10, wherein the second contact includes a contact-to-contact shielding part disposed between the first contact point part and the third contact point part, wherein the first contact point part, the contact-to-contact shielding part and a plurality of the third contact point parts are disposed side by side in this order in the pitch direction to form a connector contact point part, and the connector contact point part includes two connector contact point parts disposed in two lines facing each other with a center line along the pitch direction sandwiched between the two connector contact point parts.

12. The connector according to claim 11, wherein the two connector contact point parts are disposed such that the first contact point part, the contact-to-contact shielding part and the plurality of third contact point parts are disposed in a line-symmetric manner with respect to the center line.

13. The connector according to claim 11, wherein the two connector contact point parts are disposed such that the first contact point part, the contact-to-contact shielding part and the plurality of third contact point parts are disposed in a point symmetrical manner with respect to a center point on the center line.

14. The connector according to claim 11, the second contact includes a center ground part disposed between the two connector contact point parts.

15. The connector according to claim 9, wherein the first connection part, the second connection part and the third connection part are disposed to overlap a fitting region fit to the mating connector in the fitting direction.

16. The connector according to claim 9, wherein the first connection part, the second connection part and the third connection part are disposed outside a fitting region fit to the mating connector in the pitch direction.

17. The connector according to claim 9, wherein the first connection part, the second connection part and the third connection part are disposed in a same stage in the fitting direction.

18. A connector configured to connect one or more connection object cables and a circuit board when fit to a mating connector mounted on the circuit board, the one or more connection object cables including a first conductive path used for transmission of radio frequency signals, a second conductive path used for a shield and a plurality of third conductive paths, the connector being an electric wire-to-board connector, the connector comprising:

a first contact including a first contact point part connected to a first mating contact of the mating connector and a first connection part connected to the first conductive path;

a second contact including a second connection part connected to the second conductive path;

a third contact including a third contact point part connected to a third mating contact of the mating connector and a third connection part connected to the third conductive path; and an insulator to which the first contact, the second contact and the third contact are assembled, wherein the second contact includes a contact-to-contact shielding part disposed between the first contact point part and the third contact point part, wherein the first contact point part, the contact-to-contact shielding part and a plurality of the third contact point parts are disposed side by side in this order in a pitch direction to form a connector contact point part, and wherein the connector contact point part includes two connector contact point parts disposed such that the first contact point part, the contact-to-contact shielding part and the plurality of third contact point parts are disposed in a line-symmetric manner with respect to a center line along the pitch direction.

19. A connector set comprising:

a plug connector comprising the connector according to claim 1; and a receptacle connector comprising the mating connector.

20. A connector-equipped cable comprising:

the connector according to claim 1; and the connection object cable connected to the connector and drawn in the pitch direction.

* * * * *